(12) United States Patent
Starke et al.

(10) Patent No.: US 12,403,400 B2
(45) Date of Patent: Sep. 2, 2025

(54) LEARNING CHARACTER MOTION ALIGNMENT WITH PERIODIC AUTOENCODERS

(71) Applicant: Electronic Arts Inc., Redwood City, CA (US)

(72) Inventors: Wolfram Sebastian Starke, Edinburgh (GB); Harold Henry Chaput, Castro Valley, CA (US)

(73) Assignee: Electronic Arts Inc., Redwood City, CA (US)

( * ) Notice: Subject to any disclaimer, the term of this patent is extended or adjusted under 35 U.S.C. 154(b) by 208 days.

(21) Appl. No.: 17/657,591

(22) Filed: Mar. 31, 2022

(65) Prior Publication Data
US 2023/0310998 A1  Oct. 5, 2023

(51) Int. Cl.
*A63F 13/57* (2014.01)
*G06T 13/40* (2011.01)
*G06T 13/80* (2011.01)

(52) U.S. Cl.
CPC .............. *A63F 13/57* (2014.09); *G06T 13/40* (2013.01); *G06T 13/80* (2013.01)

(58) Field of Classification Search
CPC ......... G06T 13/40; G06T 13/80; A63F 13/57; A63F 13/13; A63F 13/56; A63F 13/428; A63F 13/213; A63F 13/655
See application file for complete search history.

(56) References Cited

U.S. PATENT DOCUMENTS

| 5,274,801 A | 12/1993 | Gordon |
| 5,548,798 A | 8/1996 | King |
| 5,982,389 A | 11/1999 | Guenter et al. |
| 5,999,195 A | 12/1999 | Santangeli |
| 6,064,808 A | 5/2000 | Kapur et al. |

(Continued)

FOREIGN PATENT DOCUMENTS

| CN | 102509272 A | 6/2012 |
| CN | 103546736 A | 1/2014 |

(Continued)

OTHER PUBLICATIONS

Liu Shikai, "Method, Device, Equipment and Storage for generating walking animation of Virtual Character", English Translation of CN 202111374361.9, Nov. 19, 2021 (Year: 2021).*

(Continued)

*Primary Examiner* — Jin Cheng Wang
(74) *Attorney, Agent, or Firm* — Knobbe, Martens, Olson & Bear, LLP

(57) ABSTRACT

The present disclosure provides a periodic autoencoder that can be used to generate a general motion manifold structure using local periodicity of the movement whose parameters are composed of phase, frequency, and amplitude. The periodic autoencoder is a novel neural network architecture that can learn periodic features from large unstructured motion datasets in an unsupervised manner. The character movements can be decomposed into multiple latent channels that can capture the non-linear periodicity of different body segments during synchronous, asynchronous, and transition movements while progressing forward in time, such that it captures spatial data and temporal data associated with the movements.

20 Claims, 12 Drawing Sheets

(56) References Cited

U.S. PATENT DOCUMENTS

| | | | |
|---|---|---|---|
| 6,088,040 A | 7/2000 | Oda et al. | |
| 6,253,193 B1 | 6/2001 | Ginter et al. | |
| 6,556,196 B1 | 4/2003 | Blanz et al. | |
| 6,961,060 B1 | 11/2005 | Mochizuki et al. | |
| 7,006,090 B2 | 2/2006 | Mittring | |
| 7,403,202 B1 | 7/2008 | Nash | |
| 7,415,152 B2 | 8/2008 | Jiang et al. | |
| 7,944,449 B2 | 5/2011 | Petrovic et al. | |
| 8,100,770 B2 | 1/2012 | Yamazaki et al. | |
| 8,142,282 B2 | 3/2012 | Canessa et al. | |
| 8,154,544 B1 | 4/2012 | Cameron et al. | |
| 8,207,971 B1 | 6/2012 | Koperwas et al. | |
| 8,267,764 B1 | 9/2012 | Aoki et al. | |
| 8,281,281 B1 | 10/2012 | Smyrl et al. | |
| 8,395,626 B2 | 3/2013 | Millman | |
| 8,398,476 B1 | 3/2013 | Sidhu et al. | |
| 8,406,528 B1 | 3/2013 | Hatwich | |
| 8,540,560 B2 | 9/2013 | Crowley et al. | |
| 8,599,206 B2 | 12/2013 | Hodgins et al. | |
| 8,624,904 B1 | 1/2014 | Koperwas et al. | |
| 8,648,863 B1 | 2/2014 | Anderson et al. | |
| 8,860,732 B2 | 10/2014 | Popovic et al. | |
| 8,914,251 B2 | 12/2014 | Ohta | |
| 9,001,132 B1 * | 4/2015 | Wooley | G09G 5/00 345/474 |
| 9,117,134 B1 | 8/2015 | Geiss et al. | |
| 9,256,973 B2 | 2/2016 | Koperwas et al. | |
| 9,317,954 B2 | 4/2016 | Li et al. | |
| 9,483,860 B2 | 11/2016 | Hwang et al. | |
| 9,616,329 B2 | 4/2017 | Szufnara et al. | |
| 9,652,879 B2 | 5/2017 | Aguado | |
| 9,741,146 B1 | 8/2017 | Nishimura | |
| 9,811,716 B2 | 11/2017 | Kim et al. | |
| 9,826,898 B1 | 11/2017 | Jin et al. | |
| 9,858,700 B2 | 1/2018 | Rose et al. | |
| 9,861,898 B2 | 1/2018 | Miura et al. | |
| 9,947,123 B1 | 4/2018 | Green | |
| 9,984,658 B2 | 5/2018 | Bonnier et al. | |
| 9,990,754 B1 | 6/2018 | Waterson et al. | |
| 9,996,940 B1 | 6/2018 | Yamasaki | |
| 10,022,628 B1 | 7/2018 | Matsumiya et al. | |
| 10,096,133 B1 | 10/2018 | Andreev | |
| 10,118,097 B2 | 11/2018 | Stevens | |
| 10,198,845 B1 | 2/2019 | Bhat et al. | |
| 10,314,477 B1 | 6/2019 | Goodsitt et al. | |
| 10,388,053 B1 | 8/2019 | Carter, Jr. et al. | |
| 10,403,018 B1 | 9/2019 | Worsham | |
| 10,440,443 B2 | 10/2019 | Casey et al. | |
| 10,535,174 B1 | 1/2020 | Rigiroli et al. | |
| 10,726,611 B1 | 7/2020 | Court | |
| 10,733,765 B2 | 8/2020 | Andreev | |
| 10,755,466 B2 | 8/2020 | Chamdani et al. | |
| 10,792,566 B1 | 10/2020 | Schmid | |
| 10,825,220 B1 | 11/2020 | Chang et al. | |
| 10,856,733 B2 | 12/2020 | Anderson et al. | |
| 10,860,838 B1 | 12/2020 | Elahie et al. | |
| 10,878,540 B1 | 12/2020 | Stevens | |
| 10,902,618 B2 | 1/2021 | Payne et al. | |
| 10,986,400 B2 | 4/2021 | Hua et al. | |
| 11,017,560 B1 | 5/2021 | Gafni et al. | |
| 11,403,513 B2 | 8/2022 | Hasenclever et al. | |
| 11,562,523 B1 | 1/2023 | Starke et al. | |
| 11,670,030 B2 | 6/2023 | Shi et al. | |
| 11,830,121 B1 | 11/2023 | Starke et al. | |
| 11,995,754 B2 | 5/2024 | Starke et al. | |
| 12,138,543 B1 | 11/2024 | Starke et al. | |
| 12,205,214 B2 | 1/2025 | Starke et al. | |
| 2002/0054054 A1 | 5/2002 | Sanbe | |
| 2002/0089504 A1 | 7/2002 | Merrick et al. | |
| 2002/0180739 A1 | 12/2002 | Reynolds et al. | |
| 2003/0038818 A1 | 2/2003 | Tidwell | |
| 2004/0027352 A1 | 2/2004 | Minakuchi | |
| 2004/0227760 A1 | 11/2004 | Anderson et al. | |
| 2004/0227761 A1 | 11/2004 | Anderson et al. | |
| 2005/0237550 A1 | 10/2005 | Hu | |
| 2006/0036514 A1 | 2/2006 | Steelberg et al. | |
| 2006/0149516 A1 | 7/2006 | Bond et al. | |
| 2006/0217945 A1 | 9/2006 | Leprevost | |
| 2006/0262114 A1 | 11/2006 | Leprevost | |
| 2007/0085851 A1 | 4/2007 | Muller et al. | |
| 2007/0097125 A1 | 5/2007 | Xie et al. | |
| 2008/0049015 A1 | 2/2008 | Elmieh et al. | |
| 2008/0111831 A1 | 5/2008 | Son et al. | |
| 2008/0152218 A1 | 6/2008 | Okada | |
| 2008/0268961 A1 | 10/2008 | Brook | |
| 2008/0273039 A1 | 11/2008 | Girard | |
| 2008/0316202 A1 | 12/2008 | Zhou et al. | |
| 2009/0066700 A1 | 3/2009 | Harding et al. | |
| 2009/0195544 A1 | 8/2009 | Wrinch et al. | |
| 2009/0315839 A1 | 12/2009 | Wilson et al. | |
| 2010/0134501 A1 | 6/2010 | Lowe et al. | |
| 2010/0251185 A1 | 9/2010 | Pattenden | |
| 2010/0277497 A1 | 11/2010 | Dong et al. | |
| 2011/0012903 A1 | 1/2011 | Girard | |
| 2011/0074807 A1 | 3/2011 | Inada et al. | |
| 2011/0086702 A1 | 4/2011 | Borst et al. | |
| 2011/0119332 A1 | 5/2011 | Marshall et al. | |
| 2011/0128292 A1 | 6/2011 | Ghyme et al. | |
| 2011/0164831 A1 | 7/2011 | Van Reeth et al. | |
| 2011/0187731 A1 | 8/2011 | Tsuchida | |
| 2011/0269540 A1 | 11/2011 | Gillo et al. | |
| 2011/0292055 A1 | 12/2011 | Hodgins et al. | |
| 2012/0029699 A1 | 2/2012 | Jing | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0244941 A1 | 9/2012 | Ostergren et al. | |
| 2012/0275521 A1 | 11/2012 | Cui et al. | |
| 2012/0303343 A1 | 11/2012 | Sugiyama et al. | |
| 2012/0313931 A1 | 12/2012 | Matsuike et al. | |
| 2013/0050464 A1 | 2/2013 | Kang | |
| 2013/0063555 A1 | 3/2013 | Matsumoto et al. | |
| 2013/0120439 A1 | 5/2013 | Harris et al. | |
| 2013/0121618 A1 | 5/2013 | Yadav | |
| 2013/0222433 A1 | 8/2013 | Chapman et al. | |
| 2013/0235045 A1 | 9/2013 | Corazza et al. | |
| 2013/0263027 A1 | 10/2013 | Petschnigg et al. | |
| 2013/0311885 A1 | 11/2013 | Wang et al. | |
| 2014/0002463 A1 | 1/2014 | Kautzman et al. | |
| 2014/0198106 A1 | 7/2014 | Sumner et al. | |
| 2014/0198107 A1 | 7/2014 | Thomaszewski et al. | |
| 2014/0285513 A1 | 9/2014 | Aguado | |
| 2014/0327694 A1 | 11/2014 | Cao et al. | |
| 2015/0113370 A1 | 4/2015 | Flider | |
| 2015/0126277 A1 | 5/2015 | Aoyagi | |
| 2015/0187113 A1 | 7/2015 | Rubin et al. | |
| 2015/0235351 A1 | 8/2015 | Mirbach et al. | |
| 2015/0243326 A1 | 8/2015 | Pacurariu et al. | |
| 2015/0381925 A1 | 12/2015 | Varanasi et al. | |
| 2016/0026926 A1 | 1/2016 | Yeung et al. | |
| 2016/0042548 A1 | 2/2016 | Du et al. | |
| 2016/0071470 A1 | 3/2016 | Kim et al. | |
| 2016/0217723 A1 | 7/2016 | Kim et al. | |
| 2016/0243699 A1 * | 8/2016 | Kim | B25J 9/1605 |
| 2016/0307369 A1 | 10/2016 | Freedman et al. | |
| 2016/0314617 A1 | 10/2016 | Forster et al. | |
| 2016/0354693 A1 | 12/2016 | Yan et al. | |
| 2017/0132827 A1 | 5/2017 | Tena et al. | |
| 2017/0221250 A1 | 8/2017 | Aguado | |
| 2017/0301310 A1 | 10/2017 | Bonnier et al. | |
| 2017/0301316 A1 | 10/2017 | Farell | |
| 2018/0122125 A1 | 5/2018 | Brewster | |
| 2018/0165864 A1 | 6/2018 | Jin et al. | |
| 2018/0211102 A1 | 7/2018 | Alsmadi | |
| 2018/0239526 A1 | 8/2018 | Varanasi et al. | |
| 2018/0293736 A1 | 10/2018 | Rahimi et al. | |
| 2019/0073826 A1 | 3/2019 | Bailey et al. | |
| 2019/0147224 A1 | 5/2019 | Li et al. | |
| 2019/0228316 A1 | 7/2019 | Felsen et al. | |
| 2019/0295305 A1 | 9/2019 | Yang et al. | |
| 2019/0303658 A1 | 10/2019 | Ando et al. | |
| 2019/0340803 A1 | 11/2019 | Comer | |
| 2019/0392587 A1 | 12/2019 | Nowozin et al. | |
| 2020/0005138 A1 | 1/2020 | Wedig et al. | |

(56) References Cited

U.S. PATENT DOCUMENTS

| | | | |
|---|---|---|---|
| 2020/0035009 | A1 | 1/2020 | Comer et al. |
| 2020/0035010 | A1* | 1/2020 | Kim ..................... G06T 13/40 |
| 2020/0058148 | A1 | 2/2020 | Blaylock et al. |
| 2020/0222757 | A1* | 7/2020 | Yang ..................... G06V 40/23 |
| 2020/0294299 | A1 | 9/2020 | Rigiroli et al. |
| 2020/0353311 | A1 | 11/2020 | Ganguly et al. |
| 2020/0388065 | A1 | 12/2020 | Miller, IV et al. |
| 2020/0402284 | A1 | 12/2020 | Saragih et al. |
| 2021/0019916 | A1 | 1/2021 | Andreev |
| 2021/0166459 | A1 | 6/2021 | Miller, IV |
| 2021/0217184 | A1 | 7/2021 | Payne et al. |
| 2021/0220739 | A1* | 7/2021 | Zinno ..................... G06N 3/08 |
| 2021/0292824 | A1 | 9/2021 | Zhang et al. |
| 2021/0312689 | A1 | 10/2021 | Akhoundi et al. |
| 2021/0335004 | A1 | 10/2021 | Zohar et al. |
| 2021/0375021 | A1* | 12/2021 | Starke .................... G06N 3/047 |
| 2021/0383585 | A1 | 12/2021 | Zhao et al. |
| 2021/0406765 | A1 | 12/2021 | Zhang et al. |
| 2022/0035443 | A1 | 2/2022 | Winold et al. |
| 2022/0068000 | A1 | 3/2022 | Herman et al. |
| 2022/0076472 | A1 | 3/2022 | Bocquelet et al. |
| 2022/0101646 | A1 | 3/2022 | McDonald et al. |
| 2022/0215232 | A1 | 7/2022 | Pardeshi et al. |
| 2022/0230376 | A1* | 7/2022 | Rozantsev ........... H04N 19/537 |
| 2022/0254157 | A1 | 8/2022 | Fu et al. |
| 2022/0292751 | A1 | 9/2022 | Kimura |
| 2022/0319087 | A1 | 10/2022 | Zhang |
| 2022/0379167 | A1* | 12/2022 | Lee .................... A63B 24/0087 |
| 2023/0010480 | A1 | 1/2023 | Li et al. |
| 2023/0123820 | A1* | 4/2023 | Wang ..................... G06T 13/40 |
| | | | 345/474 |
| 2023/0177755 | A1 | 6/2023 | Starke et al. |
| 2023/0186541 | A1* | 6/2023 | Starke .................... G06T 13/40 |
| 2023/0186543 | A1 | 6/2023 | Starke et al. |
| 2023/0237724 | A1 | 7/2023 | Starke et al. |
| 2023/0267668 | A1 | 8/2023 | Starke et al. |
| 2023/0300667 | A1* | 9/2023 | Baek ................. H04W 28/0268 |
| | | | 370/328 |
| 2023/0326113 | A1* | 10/2023 | Hellge .................... G06T 13/20 |
| | | | 345/473 |
| 2023/0334744 | A1* | 10/2023 | Liu ......................... A63F 13/65 |
| 2023/0394735 | A1 | 12/2023 | Shi et al. |
| 2024/0257429 | A1 | 8/2024 | Starke et al. |
| 2024/0307779 | A1* | 9/2024 | Wu ......................... G06T 13/00 |
| 2024/0331293 | A1 | 10/2024 | Borovikov et al. |

FOREIGN PATENT DOCUMENTS

| | | |
|---|---|---|
| CN | 105405380 A | 3/2016 |
| CN | 105825778 A | 8/2016 |
| CN | 110039546 A | 7/2019 |
| JP | 2018-520820 A | 8/2018 |
| JP | 2019-162400 A | 9/2019 |
| WO | WO 2019/184633 A1 | 10/2019 |
| WO | WO 2020/204948 A1 | 10/2020 |

OTHER PUBLICATIONS

Anagnostopoulos et al., "Intelligent modification for the daltonization process", International Conference on Computer Vision Published in 2007 by Applied Computer Science Group of digitized paintings.

Andersson et al., "Virtual Texturing with WebGL," Master's thesis, Chalmers University of Technology, Gothenburg, Sweden (2012).

Avenali, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 p.

Belytschko et al., Nonlinear Finite Elements for Continua and Structures, Second Edition, Wiley (Jan. 2014), 727 pages (uploaded in 3 parts).

Blanz et al., "A morphable model for the synthesis of 3D faces," In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Clavet, "Motion matching and the road to next-gen animation," In Proc. of GDC. 2016 (Year: 2016).

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Dudash, "Skinned instancing." NVidia white paper(2007).

Fikkkan, "Incremental loading of terrain textures," MS thesis. Institutt for datateknikk og informasjonsvitenskap, 2013.

Geijtenbeek et al., "Interactive Character Animation using Simulated Physics", Games and Virtual Worlds, Utrecht University, The Netherlands, The Eurographics Association 2011, 23 pgs.

Geijtenbeek et al. Interactive Character Animation Using Simulated Physics: A State-of-the-Art Review), Computer Graphics forum, vol. 31, 2012 (Year: 2012), 24 pgs.

Georgii et al., "Corotated Finite Elements Made Fast and Stable", Workshop in Virtual Reality Interaction and Physical Simulation VRIPHYS (2008), 9 pgs.

Habbie et al., "A Recurrent Variational Autoencoder for Human Motion Synthesis", 2017, in 12 pages.

Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez et al., "Simulating and visualizing real-time crowds on GPU clusters." Computación y Sistemas 18.4 (2014): 651-664.

Holden et al., "Phase-functioned neural networks for character control," ACM Transactions on Graphics (TOG). Jul. 20, 2017;36(4):1-3. (Year: 2017).

Hu et al., "face recognition by an albedo based 3D morphable model," In Biometrics (IJCB), 2014 IEEE International Joint Conference on Sep. 29, 2014 (pp. 1-8). IEEE.

Hu, "Face Analysis using 3D Morphable Models," Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in Computer Games", Eurographics/ACM SIGGRAPH Symposium on Computer Animation (2012), 6 pgs.

Klein, "Rendering Textures Up Close in a 3D Environment Using Adaptive Micro-Texturing," Diss. Mills College, 2012.

Komura et al., "Animating reactive motion using momentum-based inverse kinematics, "Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs, obtained Mar. 20, 2015.

Levine, S. et al., "Continuous Character Control with Low-Dimensional Embeddings", Stanford University, University of Washington, 10 pgs, obtained Mar. 20, 2015.

(56) References Cited

OTHER PUBLICATIONS

Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
McDonnell et al., "Clone attack! perception of crowd variety." ACM Transactions on Graphics (TOG). vol. 27. No. 3. ACM, 2008.
Min et al., "Interative Generation of Human Animation with Deformable Motion Models" (Year: 2009).
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse et al., "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano et al., "Controlling individual agents in high-density crowd simulation." Proceedings of the 2007 ACM SIGGRAPH/Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, "Reducing memory requirements for diverse animated crowds." Proceedings of Motion on Games. ACM, 2013.
Rungjiratananon et al., "Elastic Rod Simulation by Chain Shape Matching withTwisting Effect" SIGGRAPH Asia 2010, Seoul, South Korea, Decemer 15-18, 2010, ISBN 978-1-4503-0439-9/10/0012, 2 pgs.
Seo et al., "Compression and Direct Manipulation of Complex Blendshape Models", In ACM Transactions on Graphics (TOG) Dec. 1, 20112 (vol. 30, No. 6, p. 164). ACM. (Year: 2011), 10 p.
Sifakis, Eftychios D., "Fem Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Starke et al., "Local motion phases for learning multi-contact character movements." ACM Transactions on Graphics (TOG). Jul. 8, 2020;39(4):54-1 (Year: 2020).
Stomakhin et al., "Energetically Consistent Invertible Elasticity", Eurographics/ACM SIGRAPH Symposium on Computer Animation (2012), 9 pgs.
Thalmann et al., "Crowd rendering." Crowd Simulation. Springer London, 2013. 195-227.
Thalmann et al., "Modeling of Populations." Crowd Simulation. Springer London, 2013. 31-80.
Treuille, A et al., "Near-optimal Character Animation with Continuous Control", University of Washington, 2007, 7 pgs.
Ulicny et al., "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Vigueras et al. "A distributed visualization system for crowd simulations." Integrated Computer-Aided Engineering 18.4 (2011 ): 349-363.
Wu et al., "Goal-Directed Stepping with Momentum Control," Eurographics/ Acm Siggraph Symposium on Computer Animation, 2010, 6 pages.
Yamane et al.," Natural Motion Animation through Constraining and Deconstraining at Will" (Year: 2003).
Zhang et al., "Mode-adaptive neural networks for quadruped motion control. ACM Transactions on Graphics (TOG)." Jul. 30, 2018;37(4): 1-1. (Year: 2018).

* cited by examiner

Character Pose Frame i+1
102B

Dynamic Animation Generation System
100

Character Pose Frame i
102A

LEARNING CHARACTER MOTION ALIGNMENT WITH PERIODIC AUTOENCODERS

TECHNICAL FIELD

The present disclosure relates to systems and techniques for animation generation. More specifically, this disclosure relates to using a periodic autoencoder for dynamically generating animation.

BACKGROUND

Electronic games are increasingly becoming more realistic due to an increase in available processing resources. This increase in realism may allow for more realistic gameplay experiences. For example, elements that form an in-game world, such as characters, may be more realistically presented. In this example, the elements may be increasingly rendered at higher resolutions, with more detailed textures, with more detailed underlying meshes, and so on. While this added realism may be beneficial to an end-user of an electronic game, it may place a substantial burden on electronic game developers. As an example, electronic game developers may be required to create very rich, and detailed, models of characters. As another example, electronic game designers may be required to create fluid, lifelike, movements of the characters.

With respect to the example of movement, characters may be designed to realistically adjust their arms, legs, and so on, while traversing an in-game world. In this way, the characters may walk, run, jump, and so on, in a lifelike manner. With respect to a sports electronic game, substantial time may be spent ensuring that the characters appear to mimic real-world sports players. For example, electronic game designers may spend substantial time fine-tuning movements of an underlying character model. Movement of a character model may be, at least in part, implemented based on movement of an underlying skeleton. For example, a skeleton may include a multitude of objects (e.g., bones or joints) which may represent a portion of the character model. As an example, a first object may be a finger while a second object may correspond to a wrist. The skeleton may therefore represent an underlying form on which the character model is built. In this way, movement of the skeleton may cause a corresponding adjustment of the character model.

To create realistic movement, an electronic game designer may therefore adjust positions of the above-described objects included in the skeleton. For example, the electronic game designer may create realistic running via adjustment of specific objects which form a character model's legs. This manual tuning technique to enable movement of a character can result in substantial complexity and significant expenditure of time by developers.

SUMMARY OF CERTAIN EMBODIMENTS

Particular embodiments of the subject matter described in this specification can be implemented so as to realize one or more of the following advantages. Utilizing the techniques described herein, realistic motion may be rapidly generated for arbitrary character models configured for use in electronic games. As will be described, motion capture information can be used to generate information usable to create animations for character models. Advantageously, these animations may be responsive to real-time user input being provided by a user of an electronic game. The animation system can use a phase manifold that includes local phase information extracted from motion capture information. This phase information may therefore represent local motion phases corresponding to motion of the actor, and may be used to enhance the temporal alignment, and segmentation, of realistic motion for use during motion matching on each local motion phase. The phase manifold includes local motion phases for poses and movements of a character that capture spatial and temporal phase data associated with the movement of the character. Thus, the local motions phases can be used with the trajectory information associated with the movement to generate rich, life-like, animations for character models At present, techniques to generate realistic motion for character models may rely upon designers adjusting character models to define different types of motion. For example, to define running, a designer may string together certain adjustments of joints on a skeleton of a character model. In this example, the designer may adjust the knees, cause a movement of the arms, and so on. While this may allow for motion to be generated, it may also involve a substantial burden on the designer.

A first example technique to, at least in part, automate generation of character motion, may include using software to automatically adjust a skeleton. For example, templates of running may be pre-defined. In this example, a designer may select a running template which may cause adjustment of the joints on a skeleton. Thus, the designer may more rapidly generate motion for characters in an in-game world. However, this first example technique may lack the realism of real-world movement. For example, since different templates are being selected, the lifelike differences in movement between real-world persons is lost.

In contrast, the techniques described herein allow for the rapid generation of character animation based on automated analyses of motion capture information. For example, an actor may be placed in a motion capture studio. The actor may then perform different movements, and movement of different portions of the actor (e.g., joints) may be stored by a system.

The animation system can use local motion matching using local motion phases in order to generate animation based on motion capture information. This approach using local motion phases may allow for enhanced nuance associated with the animation. As an example, a real-life wrestler may be used as an actor. In this example, motion capture video of the wrestler may be recorded which depicts the soccer player dribbling a ball, interacting with other players, performing different moves, and so on. Local motion phase data can be determined based on this motion capture data, such that the data can be used during the motion matching processes to reproduce highly stylized, and personal, movement of the player. The local motion phase data can capture spatial and temporal phase data for the captured movement.

The animation system can additionally use a generative neural motion controller model in order to generate animation based on that based on local motion phases learned from motion capture information. This approach using local motion phases may allow for the generation on new poses based on the state of the character within the video game.

The techniques described herein therefore improve upon the functioning of prior software-based techniques to generate movement of in-game character models. As described above, prior techniques relied upon by designers to adjust positions of joints on a skeleton underlying a character model. For example, different key frames or clips of animation may be produced. In this example, an electronic game may interpolate between key frames or play these clips of animation. In contrast, the techniques described herein allow for real-time generation of motion of the character model. The motion may adhere to motion analyzed from one or more motion capture actors. Advantageously, the animation system can reproduce specific motions performed by the actors while also being able to generate animations which were not specifically depicted in the motion capture information.

The systems, methods, and devices of this disclosure each have several innovative aspects, no single one of which is solely responsible for all of the desirable attributes disclosed herein. Although certain embodiments and examples are disclosed herein, inventive subject matter extends beyond the examples in the specifically disclosed embodiments to other alternative embodiments and/or uses, and to modifications and equivalents thereof.

One embodiment discloses a computer-implemented method including, as implemented by a computing system having at least one processor configured with specific computer-executable instructions, accessing first animation control information generated by a for a first frame of an electronic game, the first animation control information including a first character pose of an in-game character; executing a motion matching process using a motion phase manifold comprising a plurality of local motion phase channels, wherein the local motion phase channels comprise spatial and temporal data for movement of the in-game character, the motion matching process results in a plurality of matched local poses, the motion matching process comprising: determining motion matching criteria for matching the local motion phase to local pose animation data for the corresponding local motion phase channel; and selecting a local pose from a plurality of eligible local poses corresponding to the local motion phase; generating a second pose of the character model based on the plurality of matched local poses for a second frame of the electronic game; and computing second animation control information for the second frame; and rendering the second frame including at least a portion of the second character pose of the in-game character within the in-game environment based, at least in part, on the second animation control information.

In some embodiments of the computer-implemented method, a plurality of local motion phase channels are associated with the in-game character of the electronic game and individual local motion phase channels represent phase information associated with the first character pose of the in-game character with an in-game environment. In some embodiments of the computer-implemented method, the local motion phase channel is represented by a two dimensional vector encoded with local motion phase characteristics of the local motion phase. In some embodiments of the computer-implemented method, the local motion phase characteristics include phase, frequency, and amplitude. In some embodiments of the computer-implemented method, selecting the local pose comprises performing a nearest neighbor search using the two dimensional vector of the local motion phase channel as compared to two dimensional vectors of local poses in the animation data. In some embodiments of the computer-implemented method, determining motion matching criteria comprises identifying a motion type associated with the second pose of the in-game character. In some embodiments of the computer-implemented method, determining motion matching criteria comprises identifying a subset of the animation data corresponding to the motion type. In some embodiments of the computer-implemented method, generating the second pose of the character model comprises blending the plurality of local poses with a global pose to generate the second pose. In some embodiments of the computer-implemented method, the first animation control information comprises information aggregated over a prior threshold number of frames. In some embodiments of the computer-implemented method, the second animation control information includes updated local motion phase channels, and wherein the updated local motion phase channels are determined via interpolation of the local motion phase channels included in the first animation control information One embodiment discloses a system comprising one or more processors and non-transitory computer storage media storing computer-readable instructions that when executed by the one or more processors, cause the one or more processors to perform operations including accessing first animation control information generated by a for a first frame of an electronic game, the first animation control information including a first character pose of an in-game character; executing a motion matching process using a motion phase manifold comprising a plurality of local motion phase channels, wherein the local motion phase channels comprise spatial and temporal data for movement of the in-game character, the motion matching process results in a plurality of matched local poses, the motion matching process comprising: determining motion matching criteria for matching the local motion phase to local pose animation data for the corresponding local motion phase channel; and selecting a local pose from a plurality of eligible local poses corresponding to the local motion phase; generating a second pose of the character model based on the plurality of matched local poses for a second frame of the electronic game; and computing second animation control information for the second frame; and rendering the second frame including at least a portion of the second character pose of the in-game character within the in-game environment based, at least in part, on the second animation control information. In some embodiments of the system, a plurality of local motion phase channels are associated with the in-game character of the electronic game, individual local motion phase channels representing phase information associated with contacts of at least one rigid bodies of the in-game character with an in-game environment. In some embodiments of the system, the local motion phase channel is represented by a two dimensional vector encoded with local motion phase characteristics of the local motion phase. In some embodiments of the system, the local motion phase characteristics include position, orientation, velocity, and acceleration of the bone. In some embodiments of the system, the computer-readable instructions further configure the one or more processors to perform a nearest neighbor search using the two dimensional vector of the local motion phase as compared to two dimensional vectors of local poses in the animation data when selecting the local pose. In some embodiments of the system, the computer-readable instructions further configure the one or more processors to identify a motion type associated with the second pose of the in-game character when determining motion matching criteria. In some embodiments of the system, the computer-readable instructions further configure the one or more processors to identify a subset of the animation data corresponding to the motion type when determining motion matching criteria. In some embodiments of the system, the computer-readable instructions further configure the one or more processors to blend the plurality of local poses with a global pose to generate the second pose when generating the second pose of the character model. In some embodiments of the system, the local motion phase channels further represent phase information associated with an external object configured to be interacted with by the in-game character. In some embodiments of the system, the second animation control information includes updated local motion phase channels, and wherein the updated local motion phase channels are determined via interpolation of the local motion phase channels included in the first animation control information.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

Like reference numbers and designations in the various drawings indicate like elements.

DETAILED DESCRIPTION

Overview

Figure 1:
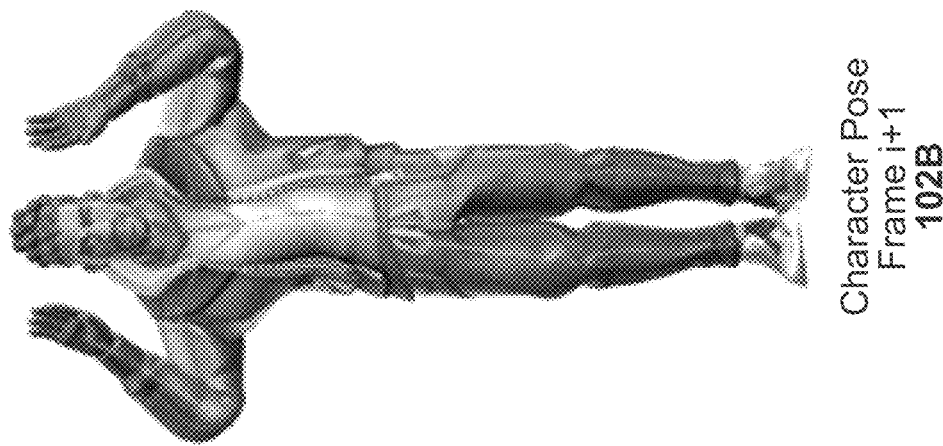
FIG. 1 is a block diagram of an example dynamic animation generation system generating a character pose for a frame of an electronic game.
Figure 1:
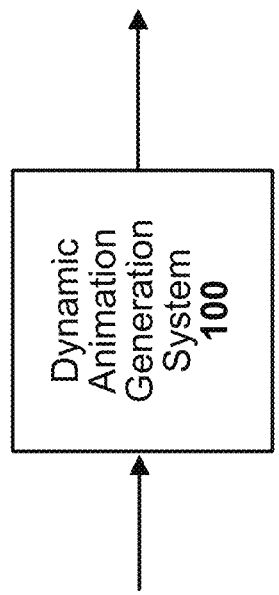
Figure 1:
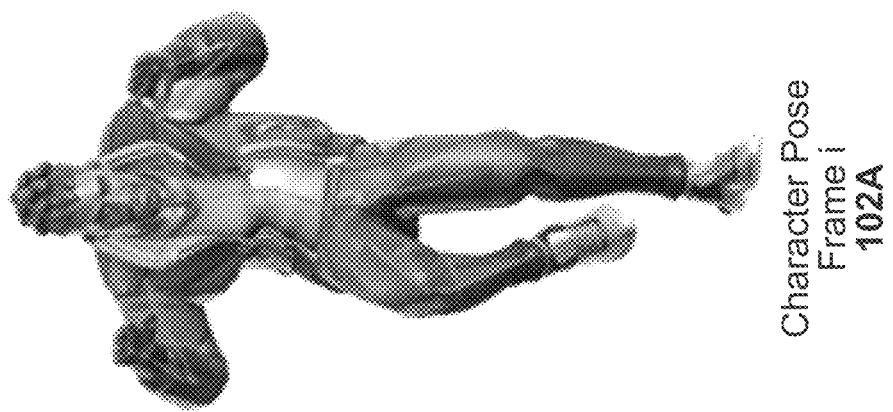

This specification describes, among other things, technical improvements with respect to generation of motion for characters configured for use in electronic games. As will be described, a system (e.g., the dynamic animation generation system 100) may implement a motion matching engine to generate realistic motion based on analyses of motion capture information. Advantageously, the system may perform substantially automated analyses of the motion capture information such that complex labeling processes and manual tuning by developers may be avoided. While electronic games are described, it may be appreciated that the techniques described herein may be applied generally to movement of character models. For example, animated content (e.g., TV shows, movies) may employ the techniques described herein.

As will be described, the system may generate realistic motion using a periodic autoencoder. The periodic autoencoder can be trained from motion capture information. The local motion phase channels may encode local motion phases based on movement of a motion capture actor. For example, actions by the actors, such as dancing or dribbling, may be recorded. In this example, specifically arm motions and foot patterns may be recorded. The local motion phase channels may encode the movement into a temporal phase space, which may enhance an understanding of temporal alignment and segmentation of motion.

As will be described, local motion phase channels may be used in conjunction with local motion matching to generate dynamic and realistic animations. A motion matching engine can be used to segment the motion matching process based on the local motion phase channels in order to generate a pose for a character. The motion matching engine can use each of the local motion phase channels associated with a character. The temporal phase space of a local motion phase can be represented as a two dimensional phase vector. The two dimensional phase vector encodes characteristics of the local motion phase such as position, velocity, orientation, acceleration, and other characteristics. In each local motion matching phase, the motion matching engine can use the two dimensional phase vectors to identify a best match within the motion capture information for the specific local motion phase. By segmenting the motion matching into local matching phase channels, the motion matching engine 120 can better define a cost function for matching the motion with the motion capture data. After identifying the motion match for each local motion phase, the pose generation system 130 can generate a global output pose for the character model. The pose generation system 130 can blend the outputs for each local motion phase to determine the output pose for the character. As will be described, realistic animations may be generated by the system based on this understanding.

Background—Motion Generation

Motion may be defined, at least in part, based on distinct poses of an in-game character. As an example, each pose may represent a discrete sample of the motion to be performed by the in-game character. For this example, the pose may identify positions of bones or joints of the in-game character. Thus, if motion is to depict running, each pose may represent a snapshot of the running. For example, a first frame generated by an electronic game may include the in-game character with both feet on a surface within the game world. As another example, a second frame may include the in-game character beginning to move one of the feet upwards. It may be appreciated that subsequent frames may include the in-game character moving forward in a running motion.

Typically, the above-described in-game character may be animated to produce this running motion. For example, an electronic game designer may generate different key frames which depict poses used for the running motion. In this example, the electronic game designer may create key frames which depict the in-game character with its feet on a surface, with one leg partially raised upwards, and so on. During gameplay, the electronic game may interpolate between these key-frames such that the in-game character appears to transition between them. As another example, clips of animation may be generated by the electronic game designer for specific motions. In this example, one or more clips of animation may be generated to represent the running motion. These clips may then be played by the electronic game to produce animation.

To generate motions for in-game characters, electronic game designers are increasingly leveraging motion capture studios. For example, a motion capture studio may be used to learn the realistic gait of an actor as he/she moves about the motion capture studio. Specific portions of the actor, such as joints or bones, may be monitored during this movement. Subsequently, movement of these portions may be extracted from image or video data of the actor. This movement may then be translated onto a skeleton or rig for use as an underlying framework of one or more in-game characters. The skeleton or rig may include bones, which may be adjusted based on the motion capture images or video. In this way, the skeleton or rig may be animated to reproduce motion performed by the actor.

While motion capture studios allow for realistic motion, they are limited in the types of motion able to be reproduced. For example, the above-described skeleton may be animated to reproduce motions which were specifically performed by the actor. Other motions may thus need to be manually created by an electronic game designer. For example, and with respect to a sports electronic game, a real-life basketball player may be used as an actor to perform common basketball motions. While this actor may perform a wide breadth of motions typically performed during a basketball game, as may be appreciated there are other motions which will not be recorded. For example, these other motions may be produced naturally by the actor during a real-world basketball game depending on locations of opponents, the actor's current stamina level, a location of the actor with respect to the basketball court, and so on.

Previous efforts at motion matching were used based on global matching of pose data with motion matching data. However, the global motion matching is limited to cyclic movements with start and end points. The global motion matching had difficulty automatically generating matches for asynchronous movements. This results in the loss of detail of individual asynchronous movements associated with individual pose. The asynchronous characteristics of the movement filtered out as system attempts to match the global characteristics of the character movement with the motion capture pose. Accordingly, global motion matching is generally limited to cyclic movements. Asynchronous or acyclic movements need to be manually programmed by the developers, which is a highly labor intensive process.

Dynamic Animation Generation System

FIG. 1 is a block diagram of an example dynamic animation generation system 100 generating a subsequent character pose 102B based on a current character pose 102A. The illustrated dynamic animation generation system 100 may represent a system of one or more computers, one or more virtual machines executing on a system of one or more computers, and so on. In some embodiments, the dynamic animation generation system 100 may represent an application, or other software, which is executed by an electronic game system. Thus, the functionality described herein may be implemented by an electronic game system during gameplay of an electronic game. As will be described, the dynamic animation generation system 100 may implement a motion matching engine 120 and pose generation engine 130 to autoregressively output character poses to generate motion.

In the illustrated example, the character pose 102A depicts an in-game virtual character dancing. This character pose 102A may therefore represent a specific pose used in a dancing action. Additionally, this character pose 102A may be rendered for output in a particular frame of animation (e.g., frame i). As may be appreciated, fluid animation may be generated at a threshold frame rate (e.g., 30 frames per second, 60 frames per second). Thus, the particular frame of animation may represent one of these frames.

As will be described in more detail, the dynamic animation generation system 100 can generate the subsequent character pose 102B based on the character pose 102A. This subsequent character pose 102B may then be rendered for output in a subsequent frame of animation (e.g., frame i+1). For example, the dynamic animation generation system 100 may determine positions, orientations, and so on, of a skeleton or rig which underlies the illustrated in-game character. In this example, the in-game character may be rendered to conform to these determined positions, orientations, such that the subsequent pose 102B may be output.

The dynamic animation generation system 100 may autoregressively generate character poses. For example, FIG. 1A illustrates the subsequent character pose 102B being generated based on character pose 102A. Thereafter, the subsequent character pose 102B may be used, at least in part, to generate another character pose. As will be described, this generation may be informed based on user input provided by an end-user using an input controller. Thus, the end-user may guide the resulting animation via interactions with the input controller.

Periodic Autoencoder Process

The dynamic animation generation system 100 can use a periodic autoencoder 200 to generate a motion phase manifold associated with the motion capture information. This may be useful for electronic games for which motion requires complex poses and transitions. Example electronic games may include sports games, fighting games, action games, and so on.

Figure 3A:
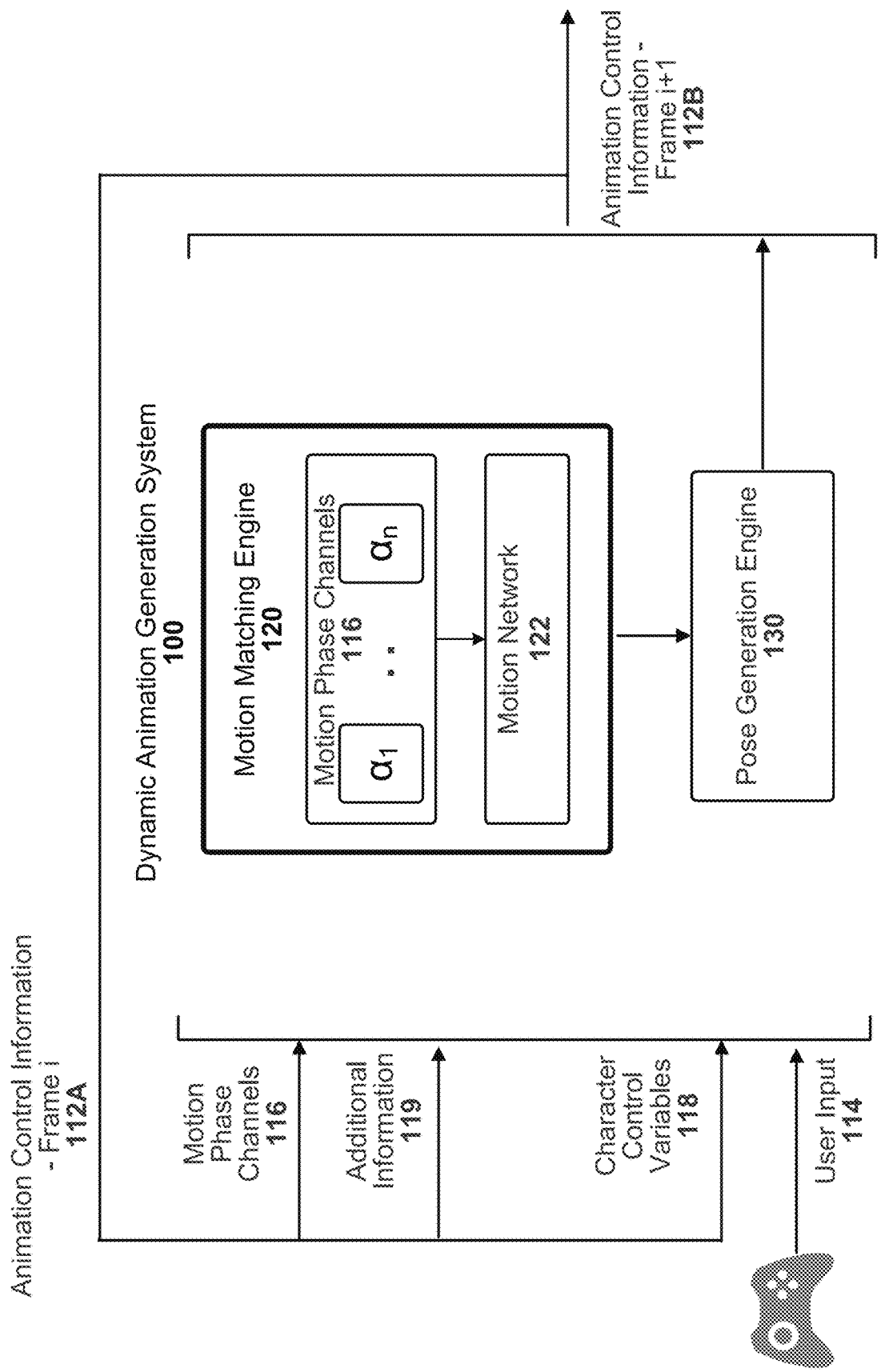
FIG. 3A is a detail block diagram of the dynamic animation generation system.
Figure 3B:
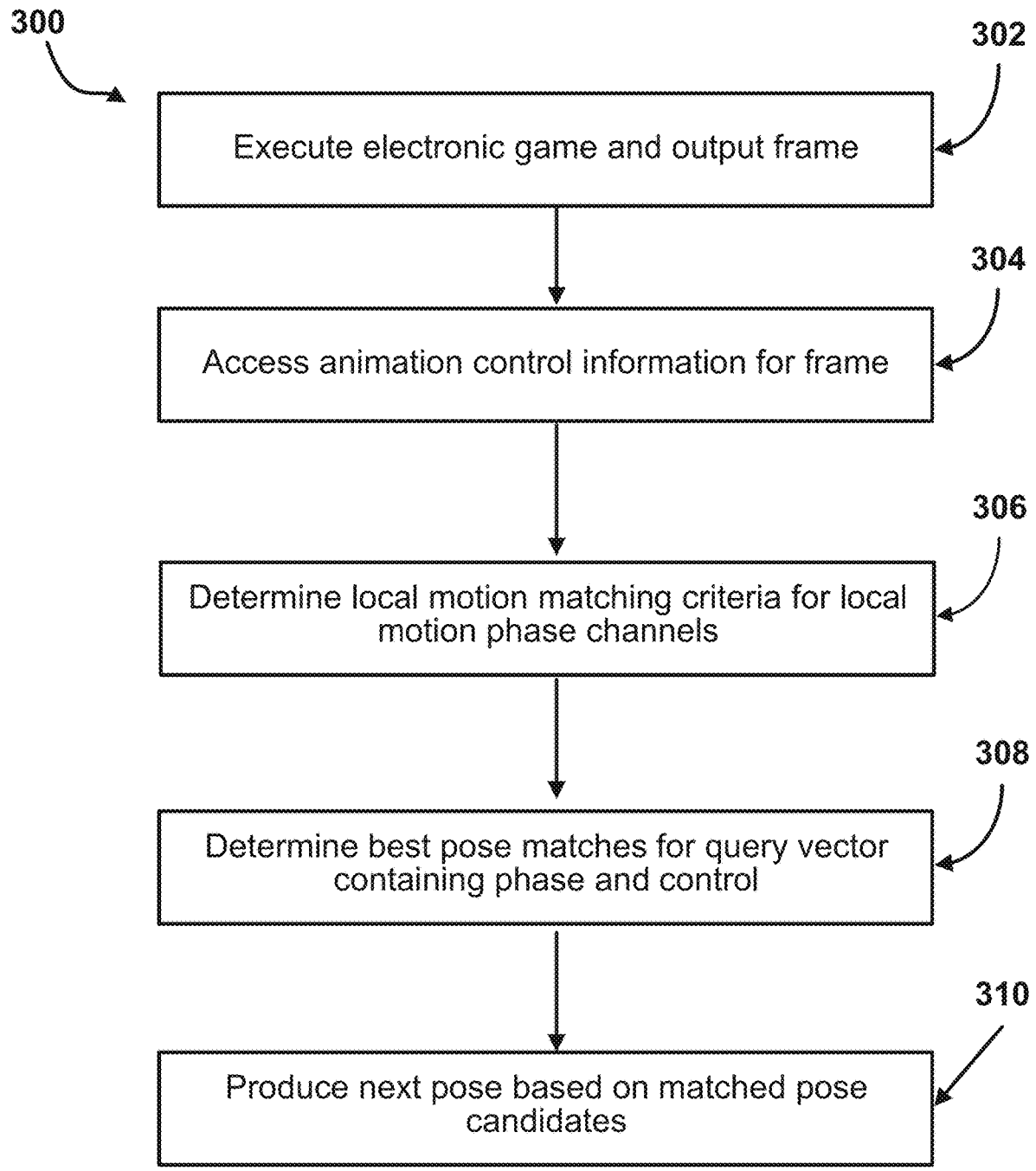
FIG. 3B is a flowchart of an example process for dynamically generating animation based on motion matching.
Figure 4:
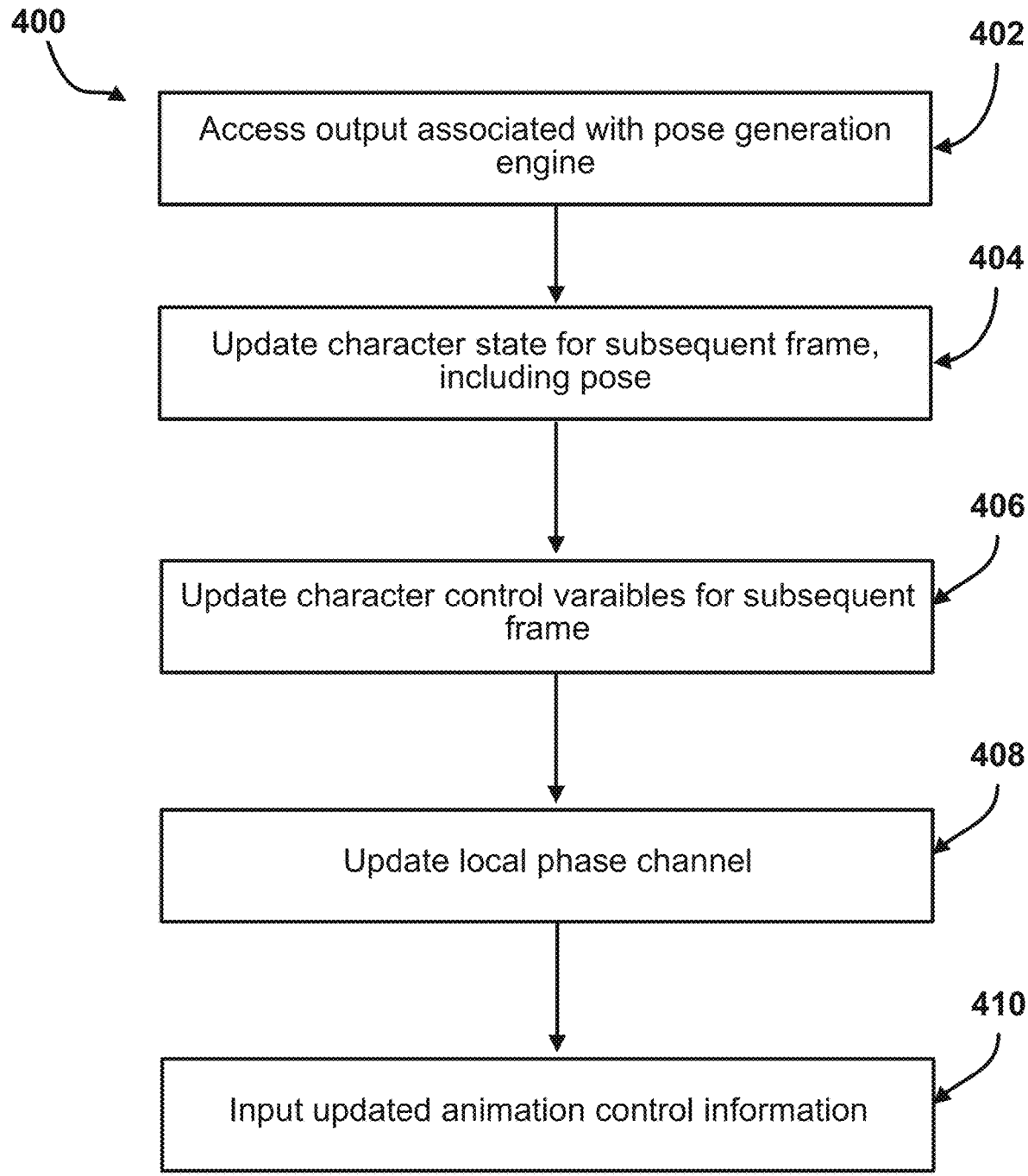
FIG. 4 is a flowchart of an example process for determining animation control information for a subsequent frame.

FIGS. 2A-2G describe examples for generating a motion phase manifold based on motion capture information using a periodic autoencoder 200. FIGS. 3A-3B and 4 describe the use of a periodic autoencoder 200 to generate a character pose based on the local motion phase channels.

The periodic autoencoder 200 provides for learning the spatial-temporal structure of the motion space and allows interpolation of motion data and production of realistic transitions within and between different types of motions. The motion space can be represented by a vector field where each sample in the space is composed of its pose and velocity.

Full-body movements can happen as a composition of multiple spatially local periodic movements. For human/quadruped motion, motion is not generally driven by a single phase signal but by a combination of multiple local phase signals. For example, when a person is waving the hand or manipulating objects while walking, or dancing a complex choreography where arms, legs or even hips and head may be moving at different timing and frequency, or when a dog is wagging its tail while running.

The periodic autoencoder 200 builds a general motion manifold structure using local periodicity of the movement whose parameters are composed of phase, frequency, and amplitude. The periodic autoencoder 200 is a novel neural network architecture that can learn periodic features from large unstructured motion datasets in an unsupervised manner. The character movements can be decomposed into multiple latent channels that can capture the non-linear periodicity of different body segments during synchronous, asynchronous, and transition movements while progressing forward in time, such that it captures spatial data and temporal data associated with the movements. The method extracts a multi-dimensional phase space from full-body motion data, which can effectively cluster animations and produce a manifold in which computed feature distances provide a better similarity measure than in the original motion space in order to achieve a better temporal and spatial alignment. This feature space can be more compact than the original motion data and a future pose can be sampled from the past pose by time-frequency increments. During training, each latent phase channel becomes tuned for different local movements and can essentially act as a band-pass filter for different ranges of learned frequency and amplitude values.

The learned periodic embedding can significantly improve data-driven character animation for a number of tasks, such as, for example, diverse locomotion skills, stylized movements, dance motion synthesis from music, synthesis of dribbling motion in football, and other types of character motion. The periodic embedding can also be used as motion query for matching poses within large animation databases in order to scale with the growing amounts of motion data available.

Periodic Autoencoder Network Structure

Figure 2A:
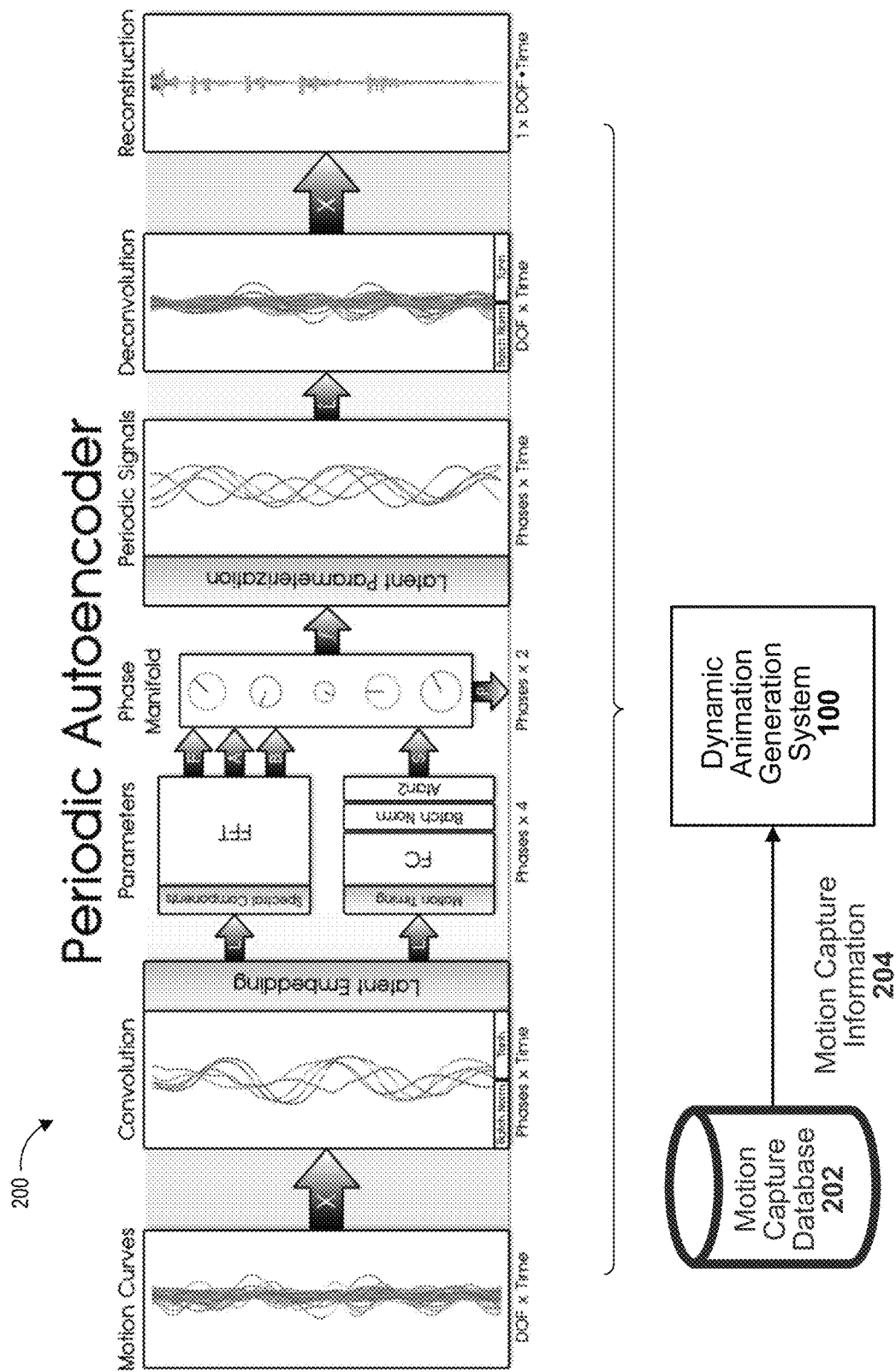
FIG. 2A is a block diagram of the dynamic animation generation system determining local motion phases based on motion capture information.
Figure 2B:
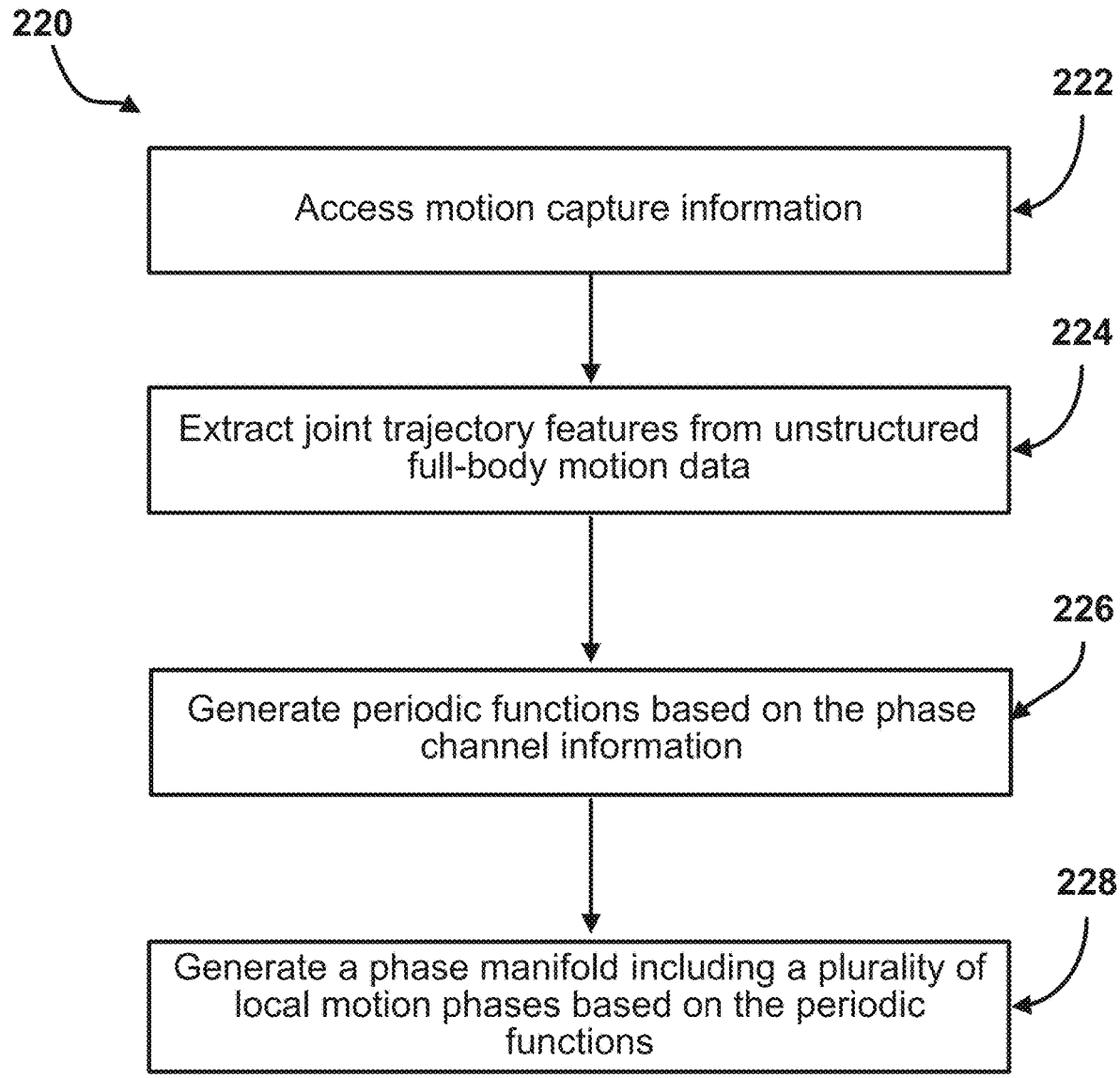
FIG. 2B is a flowchart of an example process for determining a local motion phase.

With reference to FIGS. 2A and 2B, the structure of the periodic autoencoder 200 is further described. FIG. 2B is a flowchart of an example process 220 for generating the phase manifold using the periodic autoencoder 200. The periodic autoencoder 200 can compute periodic latent vectors from the original motion data, which form the phase manifold. The structure of the network, the phase manifold formed by the network, and the training process of the network are further described herein. The periodic autoencoder 200 can be incorporated into the dynamic animation generation system 100.

At block 222, the dynamic animation generation system 100 can obtaining the motion capture training information 204 from a motion capture database 202. To transform the motion space of the motion capture information 204 into a learned phase manifold, the periodic autoencoder 200 can use a temporal convolutional autoencoder architecture structure. The model can be trained to reconstruct input, and each channel of the latent space can be in the form of a periodic function, which allows the periodic autoencoder 200 to learn a phase variable for each latent channel from a small set of parameters. These local motion phase channels can represent spatial and temporal data of the associated movement.

In an embodiment, the temporal data can be divided into overlapping windows of length N with corresponding centered time window T. N evenly spaced samples of data can be collected within a centered time window. In one example, $$T = \left[\frac{t_1 - t_0}{2}, -\frac{t_1 - t_0}{2} + \frac{t_1 - t_0}{N-1}, -\frac{t_1 - t_0}{2} + \frac{2(t_1 - t_0)}{N-1}, \ldots, \frac{t_1 - t_0}{2}\right],$$

At block 224, the system can extract joint trajectory features from the unstructured full-body motion data. Given the input motion curves, $X \in R^{D \times N}$ where D is the degrees of freedom of the body and N is the number of frames of X, an encoder, g, is trained that uses 1D convolutions to learn a lower dimensional embedding of the motion, $$L = g(X). \tag{1}$$

$L \in R^{M \times N}1$, where M is the number of latent channels, that is, the number of desired phase channels to be extracted from the motion. Periodicity can be enforced by parameterizing each latent curve in L as a sinusoidal function, defined by amplitude (A), frequency (F), offset (B) and phase shift (S) parameters. To compute A, F, $B \in R^M$ a differentiable real Fast Fourier Transform (FFT) layer can be used. The FFT can be applied to each channel of L and can create the zero-indexed matrix of Fourier coefficients $c \in C^{M \times K+1}$, K=[N/2], and then element-wise operations can be applied to compute the per channel power spectrum $p \in R^{M \times K+1}$:

$$c = FFT(L), \tag{2}$$

$$p_{i,j} = \frac{2}{N}|c_{i,j}|^2.$$

The corresponding parameters are then given by $$A_i = \sqrt{\frac{2}{N}\sum_{j=1}^{K} p_{i,j}}, \tag{3}$$

$$F_i = \frac{\sum_{j=1}^{K}(f_j \cdot p_{i,j})}{\sum_{j=1}^{K} p_{i,j}},$$

$$B_i = \frac{c_{i,0}}{N},$$

where f=(0, 1/T, 2/T, ..., K/T) is a vector of frequencies, i the channel index and j the index for the frequency bands. These operations can provide the shape parameters to construct the M periodic functions within the time window, but do not yet include the timing, that is, the phase shifts of the functions. To obtain this timing parameter, a separate fully-connected (FC) layer for each latent curve is learned that predicts the signed phase shift $S \in R^M$ at the central frame of T via an intermediate two-dimensional vector:

$$(s_x, s_y) = FC(L_i), S_i = a \tan 2(s_y, s_x), \tag{4}$$

where i is the channel index.

At block 226, the system can generate periodic functions based on the phase channel information. From learned parameters F, A, B and S, along with the known time window T, it is possible to reconstruct a parameterized latent space ˆL in the form of multiple periodic functions that have the same shape dimensionality as the original latent embedding using the parameterization function $f$:

$$L=f(\mathcal{T},A,F,B,S)=A\cdot\sin(2\pi\cdot(F\cdot\mathcal{T}-S))+B \tag{5}$$

The periodic autoencoder 200 can decode the parameterized latent space using 1D deconvolutions in decoder, h, to map back to the original input motion curves:

$$Y=h(\hat{L}). \tag{6}$$

Figure 2C:
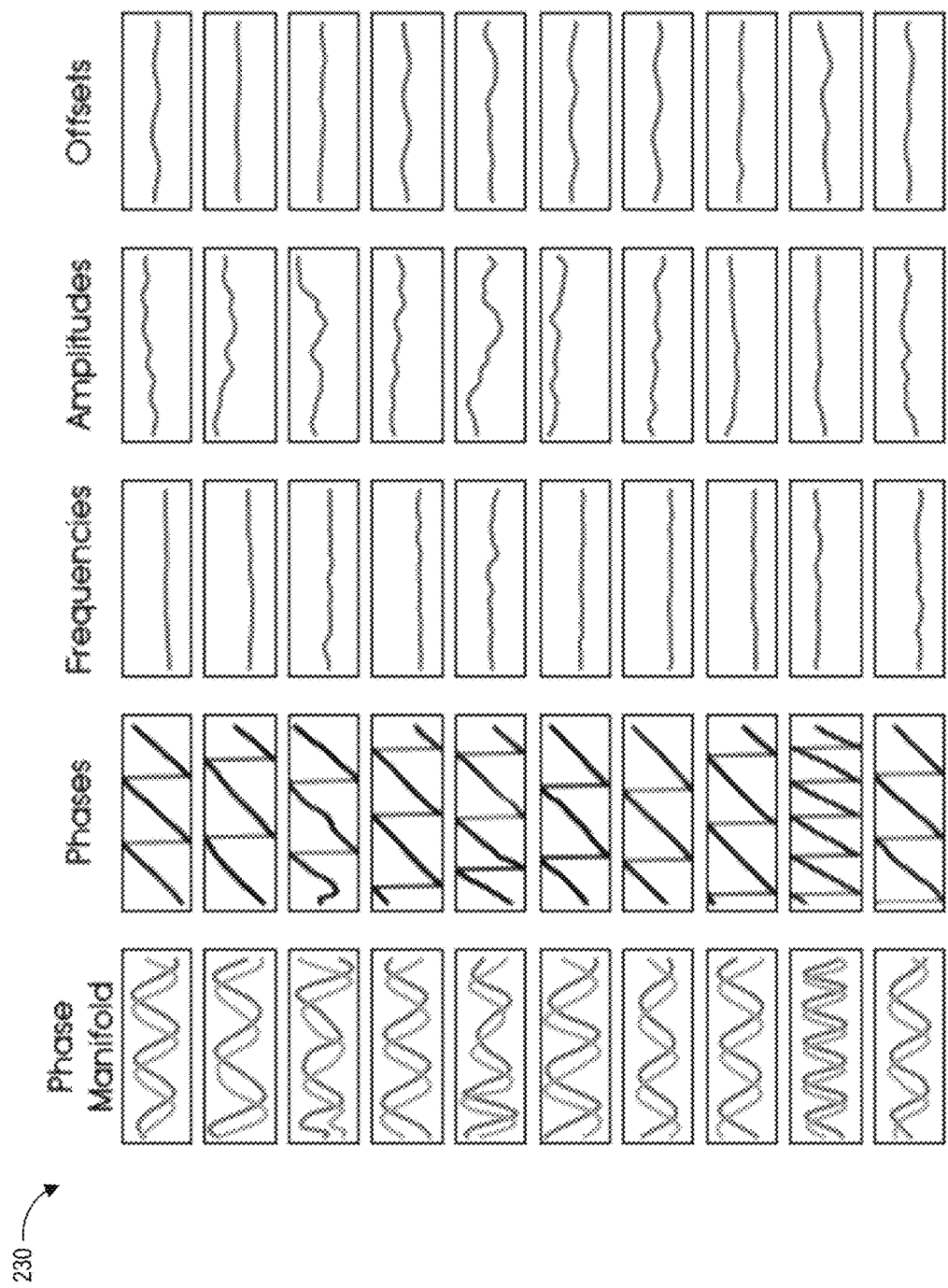
FIG. 2C-2G illustrates example graphical representations of the process for determining local motion phase.

This can induce the network to learn the time alignment of poses across different motion clips and assigns a changing phase to each new frame of motion in a one-directional manner. To see why, consider a window of motion centered at frame t, extracted from some longer motion clip and encoded to create ˆL. The parameters A, F and B constrain the shape of the periodic signals and the network has to learn to position the curves correctly using S. For a window of motion centered at frame t+1, extracted from the same motion clip, any expected changes in A, F and B will be very small, such as illustrated in FIG. 2C, so S needs to progress to keep the latent space aligned with the motion since the same convolutional decoder is used. That is, the model can effectively learn to predict 2D vectors rotating in a clockwise direction to change the values of the periodic embedding from which it needs to reconstruct the input curves.

Phase Manifold

At block 228, the system can generate a phase manifold including a plurality of local motion phase channels, also referred to as local motion phases, based on the on the computed periodic functions. The forming the phase manifold using the periodic latent variables computed by the periodic autoencoder 200 is now described. After network training, the periodic parameters for an unstructured motion dataset can be computed per frame by shifting the convolutional operator along the motion curves. The periodic parameters represent the local periodicity of the latent variables: using them a phase manifold P of dimensionality $R^{2M}$ can be formed, where each sample in frame i is computed by $$\mathcal{P}_i = A_i \cdot (\sin(2\pi \cdot S_i), \cos(2\pi \cdot S_j)). \tag{7}$$

The features in P can describe the timing of the frame within the input motion X and greatly help to align motions within the same class or across different classes of motions. The local motion phase channels s can provide spatial and temporal data associated with the movement and can effectively function as an input feature for neural motion synthesis or motion matching. Usage of the phase manifold is further described herein with reference to FIGS. 3A-3B and 4.

Figure 2D:
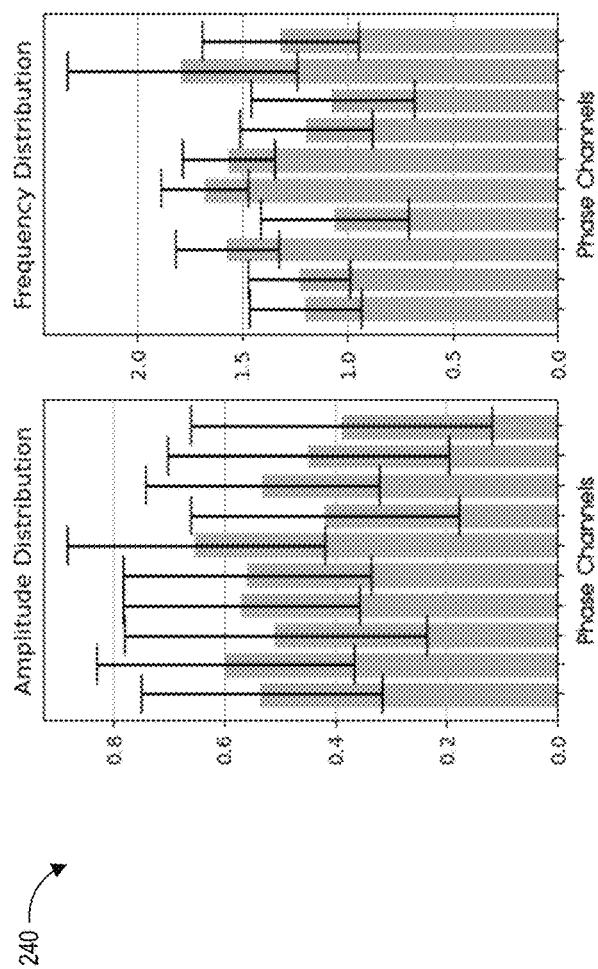

FIG. 2C illustrates a chart 230 that includes the phase variables of ten channels within a short time window for an example motion clip. It can be observed that each channel learns features different frequencies, which correspond to different speed of movements. The plot 240 of the distribution of amplitudes and frequencies of each learned phase channel is illustrated in FIG. 2D. The phase channels can be referred to as local motion phases. It can be observed that each phase channel learns to extract different ranges of amplitude and frequency values across the movements. Each channel can become tuned for a specific range of amplitudes and frequencies to decompose the motion, roughly acting like a set of learned band-pass filters. No parameter ranges need to be predefined for each phase channel but can be extracted as needed by the model. The system can encode various details or patterns of motion, which are useful for time alignment.

Given a motion sequence, the periodic feature can smoothly shift over the phase manifold. Since the amplitude and frequency of each phase channel can alter over time, the periodic autoencoder 200 can encode non-periodic motions as well as periodic motions, such as transitions from one type of motion to another. Such non-periodic transitions or motion behaviors may be observed in the form of amplitudes increasing or decreasing for different channels (e.g., a human walking and starting to wave hands), or asynchronous changes in phase shift or frequency (e.g., transitioning between pace and trot for quadrupeds).

Figure 2E:
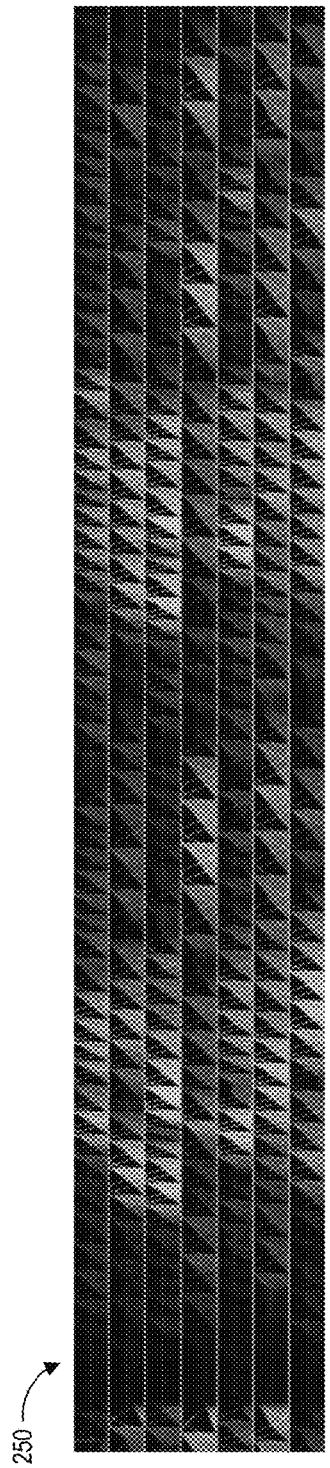

FIG. 2E demonstrates examples where the phases can exhibit cyclic or acyclic patterns throughout an entire motion clip. The chart 250 in FIG. 2E illustrates the extracted phase space for an entire animation clip containing different football motion behaviors. Each row is one phase channel for which the height defines the phase value and the opacity represents the phase amplitude. Since the parameters are learned individually for each motion frame as a function of time, non-linear transitions of the periodic phase parameters can be extracted to optimally align the movements across different animation clips.

Model Training

In an embodiment, to train the periodic autoencoder 200, the 3D joint velocity trajectories can be used as input to the network, each of them transformed into the root space of the character. A window-based mean can be subtracted to center the motion curves, but standard scaling may not be supplied in order to maintain the relative differences. In an embodiment, the input data covers 60 frames (1 second) each in past and future around the center frame at 60 Hz framerate. This can be used to construct an input vector $X \in R^{3 \cdot J \times N}$ where J is the number of character joints and N (=121) is the number of time samples.

For the encoder, two convolutional layers can be used to produce a mapping $(3 \cdot J \times N) \to (J \times N) \to (M \times N)$ to compute the motion curve embedding. Each convolution can be followed by a batch normalization and tan h activation function. Since operations can be directly performed on the latent space to extract periodic parameters, it has been observed that batch normalization can significantly help stabilize the training for this task and can help prevent the latent space distribution to decay or the model to start overfitting when trained for too long. A batch normalization can be applied to the predicted phase shift vector before calculating its signed angle. The decoder again involves two convolutional layers to compute a mapping $(M \times N) \to (J \times N) \to (3 \cdot J \times N)$, but with batch normalization and tan h activation applied only after the first deconvolution but not to the output layer. In an example embodiment, the periodic autoencoder 200 was trained using AdamW optimizer for 30 epochs, using a learning rate and weight decay both of $10^{-4}$ and a batch size of 32. Training with a NVIDIA RTX 3080 GPU typically takes less than an hour for smaller datasets (~1 hour motion data and ~24 character joints), but may take longer if the dataset or number of joints becomes larger. Regarding the number of phase channels, 4-10 are typically enough depending on the variety of motions in the data. For regular biped locomotion four or less phase channels can be sufficient, more phase channels are useful to accurately model more complex movements such as dancing, quadrupeds, or movements in a large range of different styles.

Figure 2F:
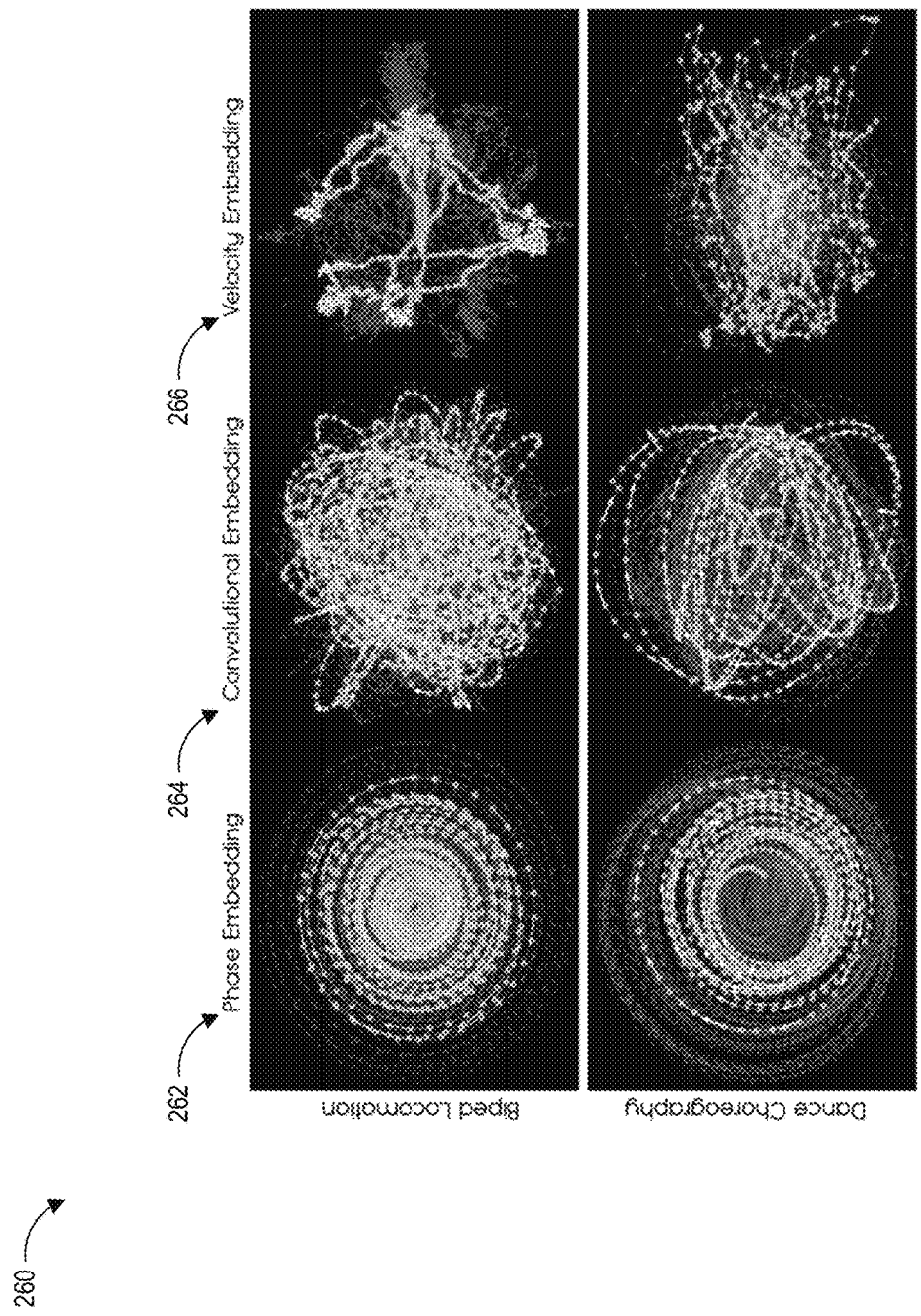

After computing the phase manifold for each dataset as described above, the phase variables for the motion clips can be extracted as a set of multiple phase channels, as shown in FIG. 2E. Sequences of the motion in biped locomotion and dance motion are illustrated in FIG. 2F. A chart 260 provides visualization of the principle components (PCs) of the phase features that are computed and projected onto a 2D plane (see FIG. 2F, Phase Embedding 262). For comparison, an embedding is computed by replacing the phase layers with fully connected layers, and similarly projecting them to a 2D plane after computing their PCs (see FIG. 2F, Convolutional Embedding 264). Finally, the PCs of original joint velocities (see FIG. 2F, Velocity Embedding 266). In contrast to the velocity embedding where samples are loosely connected in different regions of the feature space, the phase embedding presents a uniform distance between neighboring samples while progressing in a unidirectional manner. Specifically, it can be observed that the phase manifold has a consistent structure similar to polar coordinates. The cycles represent the primary period of the individual motions moving, where the timing is represented by the angle around the center, and the amplitude as the velocity of the motion. Furthermore, samples smoothly transition between cycles of different amplitude or frequency, which can indicate transition points between movements. Compared to the direct projection of the joint velocities using PCA, the data is considerably better organized and segmented, making it more useful for computing the similarity of the pose during various actions.

Figure 2G:
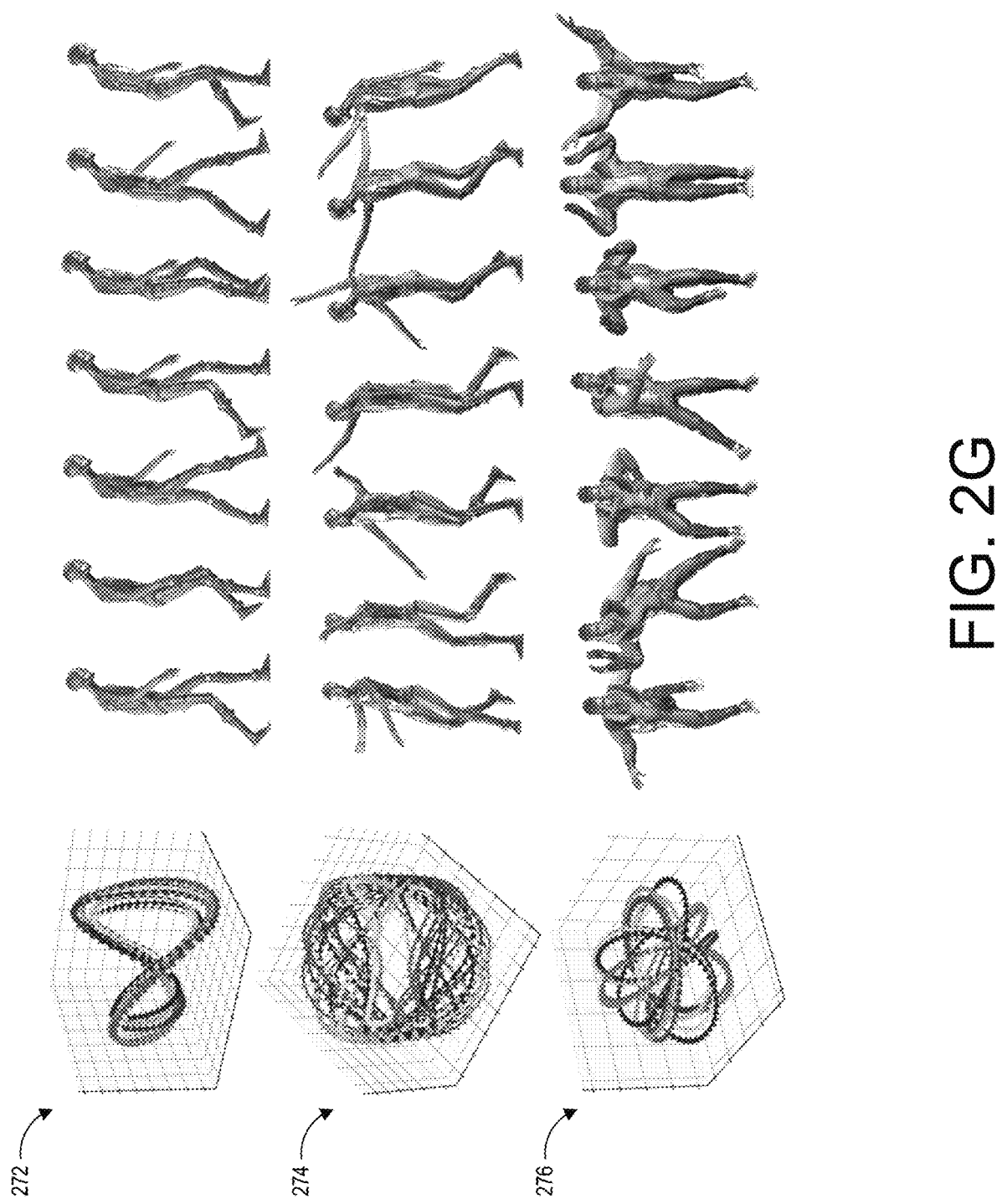

The results of visualizing the PCs of biped walking 272, stylized multi-periodic walking 274 and dancing motion 276 in 3D are shown in FIG. 2G. While there is only one monotonic cycle for the locomotion, multiperiodic cycles are visible for the stylized walk: the arms are moving faster in this walking style whose period is captured in the vertical waves. The dancing motion is composed of multiple sub-cycles with different frequencies. This results in cycles of various orientations overlapped with one another.

Implementation of Periodic Autoencoder 200 with Motion Matching

FIG. 3A is a block diagram illustrating detail of the dynamic animation generation system 100 utilizing the periodic autoencoder 200 to generate animation with motion matching. In this illustrated example, the dynamic animation generation system 100 includes example engines 120 and 130, which are collectively usable to dynamically generate animation.

In context of motion matching, one of the differences between motion matching using a local motion phase channel is that instead of matching higher-dimensional pose or velocity features of the current character state, the system matches lower-dimensional phase vectors to search for the pose at the next frame given the user control signals, such as the root trajectory. The Euclidean distance between neighboring points in phase space that are adjacent to each other is generally uniform, which means that matched poses by motion matching will have similar differences in time. This enables synthesizing more smooth and realistic movement transitions with less parameter tuning, which is not easily the case when matching Cartesian pose features (see FIG. 2F, 264) that need to be handpicked for specific joints (e.g., feet for locomotion) or require additional filtering.

Animation Control Information

The dynamic animation generation system 100 may generate particular information, referred to herein as 'animation control information', which may be autoregressively used to generate motion for an in-game character. For example, the animation control information may indicate a character pose (e.g., character poses 102A-102B illustrated in FIG. 1). As illustrated, animation control information 112A generated for a first frame (e.g., frame 'i') may be used as an input for a second frame (e.g., frame 'i+1'). Animation control information 112B for the second frame may be generated by the system 100, and an underlying skeleton or rig of an in-game character may be updated according to an indicated character pose for the second frame.

In addition to character pose, the animation control information 112A may include local motion phase channels 116. As described herein, local motion phases may be determined based on motion capture information of one or more actors. For example, the local motion phase channels 116 may be determined according to motions of an actor. Local motion phase channels s can represent spatial data and a temporal phase space associated with different types of motion of the actor. The local motion phase channels can be represented by 2D phase vectors. As will be described, the local motion phase channels may be determined for different periods of time within the motion capture information. Thus, local motion phase channels may be specific to subsets of the motion capture information, such as a motion type. With respect to a particular type of motion, such as dribbling while evading an opponent, the combination of local motion phase channels may encode the unique segmentation of motion associated with this dribbling. For example, the specific dribbling patterns, foot fall patterns, and so on may be captured in this phase space.

During runtime, such as during gameplay, local motion phases 116 may be generated for an in-game character. For example, the dynamic animation generation system 100 may autoregressively update local motion phase channels according to the gameplay. As an end user controls an in-game character, the dynamic animation generation system 100 may update the local motion phase channels according to the character position and state of movement within an in-game environment.

Animation control information 112A may further include character control variables 118. These variables 118 may inform the in-game character's motion. For example, the character control variables 118 may include trajectory information for the in-game character. In this example, the trajectory information may indicate positions of the in-game character (e.g., a current position and optionally one or more prior positions), velocity of the in-game character (current velocity and optionally one or more prior velocities), and so on. The character control variables 118 may be used to predict subsequent motion of the in-game character. For example, if the in-game character is running forward in frame 'i' then it may be determined that the in-game character will remain running forward in frame 'i+1'.

Character control variables 118 may additionally include interaction vectors which are usable to describe motion associated with the in-game character's interaction with an external object or environment (e.g., a soccer ball) within a game world. For example, and with respect to a soccer game, the interaction vectors may be used to direct ball control, such as ball dribbling, controlling switching and turning maneuvers, and also the position of the ball. To determine the interaction vectors, the system may determine three-dimensional pivot vectors associated with the character. For example, the three-dimensional pivot vectors may represent horizontally-normalized vectors around a root of the character. The character control variables may further include label information used to describe specific types of motion or actions which the character is performing. Example labels may include Stand or Move and may therefore indicate whether the character is standing or moving for a window of frames centered on a particular frame. With respect to soccer, example labels may include Dribbling, Shooting, Passing, and so on.

While the character control variables 118 may be used to predict motion, as may be appreciated the end user may adjust the in-game character's motion via user input 114. For example, the end user may utilize an electronic game controller to provide user input in the form of interactions with buttons, control sticks, and so on. In the above-described example in which the in-game character is running, the end user may provide user input 114 to maintain the running. For example, the user input 114 may indicate that a certain control stick is being pushed forward. However, the user input 114 may also indicate that the in-game character is to cease running or perform another movement (e.g., run, shift directions, pass, and shoot a ball, and so on).

The character control variables 118 and user input 114 may therefore be combined by the dynamic animation generation system 100. In this way, the user input 114 may provide adjustments to motion predicted in frame 'i'. In some embodiments, the character control variables 118 and user input 114 may be separately weighted prior to combining. Therefore, a greater or lesser weight may be applied to the user input 114.

The animation control information 112A may further include additional information 119. For example, character state information associated with an in-game character may be included. The character state may indicate, for example, the character pose for the in-game character. For example, the character state may represent positions, rotations, and velocities of bones used in an underlying skeleton or rig of the in-game character.

The additional information 119 may further include conditioning features. For example, conditioning features may be used to describe contacts by the in-game character with an in-game environment. In this example, the contacts may indicate contacts with hands, feet, a head, an external object (e.g., a ball), and so on, by the in-game character with an in-game environment. As may be appreciated, these contacts may be used by the dynamic animation generation system 100 to inform the updating of the local motion phase channels 116.

The additional information 119 may further include conditioning features that includes ball movement information, such as in a sports game. For example, the position and velocity of an in-game soccer ball may be utilized by the system 100 to dynamically generate animation. In this example, the basketball may be used to inform movement of the in-game character's hands, movement of the ball itself, and so on.

The additional information 119 may further include opponent information. For example, the opponent information may reflect a state of an in-game opponent with respect to the in-game character. Example information may include labels indicating whether the opponent (or portions thereof) are within a threshold radius of the in-game character. Example information may further include vectors indicating position samples between the opponent and in-game character along with direction and velocity of the opponent trajectory. An illustration of opponent information is included in FIG. 5B. As will be described, the dynamic animation generation system 100 may be trained in some embodiments using motion capture information which includes motion of an actor and at least one other actor representing an opponent. The dynamic animation generation system 100 may use captured data that are indicative of the actor's motions to handle proximity of the other actor.

Motion Matching Engine

With respect to the illustrated example, the animation control information 112A for frame 'i' may then be provided to motion matching engine 120. The motion matching engine 120 is configured to perform local motion matching using the local motion phase channels 116. Rather than doing a global motion match for the entire character pose, the motion matching engine 120 segment the motion matching process into individual phases, where each local motion phase channel undergoes a separate motion matching process. By increasing the granularity of motion matching, the motion matching engine 120 can reduce that conflicting movements of the character's limbs and preserve movement detail. For example, each local motion phase channel can provide motion data, such as spatial and temporal data, for aspects of the character, which may have different position, velocity, and trajectory information, that is conflicting for a specific movement. These asynchronous movements can be captured by using local motion phase channels, thereby increasing the detail and realism of a character's movements.

The motion network 122 may provide rules and weights for using motion matching to match the individual local motion phases 116. The motion network can define rules and weights that are specific to different motion types in order to better match and generate certain types of motion. The motion network 122 can define cost functions and searching criteria for use in identifying matches during a search, such as a nearest neighbor search. The motion network can further define changes in the search vector and segmentation of search data, such as segmenting search data based on motion type. The motion network can determine how to perform motion matching for each of the local motion phases. The motion network can contain information for augmenting the phase features with additional information such as labels identifying movement styles or action type. The matching criteria can be based on user input 114, character control variables 118, and the additional information 119. In some embodiments, for each local motion phase, the motion matching engine can perform a nearest neighbor search to identify the closest match. The cost functions defined by the motion network can vary based on motion type as well as by local motion phase. The weights for each of the variables in the cost function can be individually tuned. The motion matching engine can execute the local motion matching process for each local motion phase 116.

Pose Generation Engine

To generate the animation control information 112B for frame 'i+1', the dynamic animation generation system 100 includes a pose generation system 130. As described above, the motion matching engine 120 may determine the matches for the local motion phase channels 116. For example, the motion matching engine can determine a local motion phase match for different aspects of the character, such as right and left feet, the right and left hands, and a ball. The local motion phase are segmentations of the character motion, which map to a full-body pose for character. The pose generation system 130 can blend the local motion phase matches with the character model to generate an updated character pose. The updated character pose can be output as animation control information 112B. The pose generation system 130 can use blending to reduce the occurrence of blurry, or otherwise unnatural, motions in order to adapt to different types of motions and tasks.

In this way, the pose generation system 130 can generate an updated pose, at least in part, during runtime for each frame, or a subset of frames, based on an output of the motion matching engine 120. The pose generation system 130 may also use the additional information 119 for frame 'i' along with the user input 114. A forward pass through the pose generation system 130 may be computed and the animation control information 112B for frame 'i+1' may be output by the dynamic animation generation system 100.

Therefore, the pose generation system 130 may output a character pose for frame 'i+1'. Similar to the above, the animation control information 112B may then be provided as input to the dynamic animation generation system 100, which may continue autoregressively generating motion for the in-game character. The generated motion may be animated by the in-game character through adjustment of, at least, the character pose.

Dynamic Animation Generation Process

FIG. 3B is a flowchart of an example process 300 for dynamically generating animation using motion matching based on local motion phases. In some embodiments, the system may represent an electronic game console of one or more processors which is configured to execute electronic games. The dynamic animation generation system 100 may be used to autoregressively generate motion for an in-game character by implementing process 300. The dynamic animation generation system 100 may include different elements usable to generate the motion. For example, FIG. 3A includes a motion matching engine 120 and a pose generation system 130. The example process 300 can be implemented, at least in part, by the motion matching engine 120 and the pose generation system 130. The output of the motion matching engine 120 can be provided to the pose generation system 130. The output of the pose generation system 130 may be used to determine, at least, a character pose for a subsequent (e.g., next) frame. Thus, the in-game character may be rendered according to the character pose in the subsequent frame. For convenience, the process 300 will be described as being performed by a system of one or more computers (e.g., the dynamic animation generation system 100).

At block 302, the system executes an electronic game and outputs a frame. As described herein, the system may implement an animation system usable to update one or more in-game characters of an electronic game. For example, the animation system may cause character poses of the in-game characters to be updated such that animation may be generated.

In some embodiments the system may represent an application, or software, which is in communication with an electronic game. For example, an electronic game console may execute the electronic game and the application or software. In this example, the electronic game console may provide information during runtime of the executing game for use by the application or software. Example information may include a game state associated with the electronic game, which may be used by the application or software to generate or derive the animation control information described above. The application or software may therefore update character poses of one or more in-game characters and provide the updated character poses to the electronic game. In response, the electronic game may update the in-game characters accordingly.

In some embodiments, the system may represent a portion of an electronic game. For example, the motion matching engine 120 may be included in the electronic game (e.g., as a module). The motion generation model, generated by the periodic autoencoder 200, may then access the game state and cause updating of a pose of in-game characters.

At block 304, the system accesses animation control information for the frame. As described above, with respect to at least FIGS. 1 and 3A, the system may autoregressively generate animation control information. Thus, the system may access animation control information which was generated for the output frame. The information may then be used to generate subsequent animation control information for a subsequent frame.

The animation control information may include local motion phases for movement of an in-game character being controlled by an end user and/or an external controller. Example local motion phases may control positioning and motion of the hands, legs, head, and so on for the in-game character. The animation control information may include external objects, such as, an object with which the in-game character typically interacts. The external object may also represent an object which typically interacts with the in-game environment. In this way, the local motion phase(s) for the external object may provide an understanding of types of motion that the external object undergoes. With respect to a sports game, the object may represent a ball (e.g., a soccer ball). With respect to action games, the object may represent a sword, a bow, a wand, a hammer, and so on.

As described above, the local motion phases may be autoregressively generated by the system. For example, as the end user's in-game character traverses the in-game environment, information used to update the animation control information may be monitored. For example, as will be described in FIG. 4, the system may use this information to update the animation control information for use in a subsequent frame. Thus, the in-game character's leg (e.g., foot) comes into contact with an in-game environment, this contact information may be used to update the local motion phase associated with the leg.

At block 306, the system, determines local motion matching criteria for each local motion phase. The animation system segments the motion matching process according to the local motion phases and determines the criteria used for performing each local motion matching process. The animation system can determine rules and weights for use with the present local motion match for the individual local motion phase. The rules and weights can be defined rules specific to different motion types in order to better match the local motion phase with the motion data. The animation system can provide the cost function and searching criteria for use in identifying matches during the search. The animation system can further define the search vector and segmentation of search data, such as segmenting search data based on motion type. The cost functions and matching criteria can vary based on motion type and local motion phase.

Generally, the matching criteria can be based on user input 114, character control variables 118, and the additional information 119. In some embodiments, for each local motion phase, the motion matching engine can perform a nearest neighbor search to identify the closest match.

At block 308, the motion matching engine determines best pose matches for query vector containing phase and control. During the matching process the animation system can identify the animation data close to the local motion phases. The comparison can be between the 2D phase vector for the local motion phase and 2D phase vectors for the animation data. The 2D phase vector is representative of reference features of the local motion phases. The animation system can calculate a score based on the phase vector of the local motion phases and the corresponding phase vectors of the potential start frame. The score may be calculated as a weighted average of the difference between each of the reference features of the current frame and the corresponding reference features of the potential start frame. For example, a difference between a location of foot for the current pose and the potential position of the pose of the animation data. Further, the weighted average may include differences between velocities of motion of the local motion phases as well as locations of local motion phases in three-dimensional space. Some reference features present in the vectors may be more important than other reference features and may be weighted differently in creating the weighted average. The acceleration or deceleration of movement of a local motion phase and/or the change in velocity of the local motion phase may be weighted differently based at least in part on the type motion. The search data can be segmented based on the motion type. For example, the search vector may only identify matches for motion data tagged with a specific motion type.

At block 310, after matches for bone level phases are complete, the animation system uses the matched animation data from each of the local motion matching phases to generate a global character pose. The animation system can blend the local motion phase matches with the character model to generate an updated character pose. The pose generation system 130 can use blending to reduce the occurrence of blurry, or otherwise unnatural, motions in order to adapt to different types of motions and tasks.

Thus, the animation system may substantially generate updated poses in real-time for each local motion phase. Since local motion phases are used, the animation system can quickly react to updates regarding types of motion and actions which are being performed by the end user's in-game character. As described above, the local motion phases may enhance realistic temporal alignment of character poses to form realistic animation of the end user's in-game character.

The animation system may additionally receive user input and/or character control information. For example, the animation system may use character control variables which inform, at least, trajectory information associated with the end user's in-game character. If the end user provided user input (e.g., within a threshold amount of time), the user input may be combined with the character control variables to inform motion of the character.

Using the above-described input information, the animation system may determine output information usable by the pose generation system 130 and to update the animation control information.

Additionally, to update the animation control information the system may access game state information. As described above, the animation control information may be generated for different frames which are centered on a threshold number of frames. For example, animation control information may be generated for a first frame of motion capture information which is centered on a threshold number of frames. Similarly, the system may use game state information when generating the output from the prediction network. Thus, if the in-game character interacted with an in-game environment, this interaction may be obtained by the system. Similarly, if an opponent moved this information may be appended as an input.

FIG. 4 is a flowchart of an example process 400 for determining animation control information for a subsequent frame. For convenience, the process 400 will be described as being performed by a system of one or more computers (e.g., the dynamic animation generation system 100). In some embodiments, the system may represent an electronic game console of one or more processors which is configured to execute electronic games.

At block 402, the system accesses local phase output associated with the animation system. The animation system generates output for use in updating animation control information for a subsequent frame.

At block 404, the system updates a character state for the subsequent frame. The output may indicate the character state for use in the subsequent frame, such as the character pose which an end user's in-game character is to assume.

At block 406, the system updates character control variables for the subsequent frame. As described in FIGS. 1 and 3A, character control variables may be used to inform motion of the character. The character control variables in the output of the animation system may be combined with received user input. For example, the user input may represent the end user interacting with an electronic game controller. As may be appreciated, these interactions may occur slower than an output frame rate of the electronic game. Thus, the user input may be combined with the character control variables for any frame in which the end user is interacting with the controller. The user input may also be aggregated over a threshold number of prior frames and used to update the character control variables every threshold number of frames (e.g., every 5 frames).

Since the user input is provided in the form of course, high-level controls, the system may convert the user input into a similar form as the character control variables. For example, if the end user is holding down a control stick to move forward, then the system may generate trajectory information indicating that the in-game character is to move forward. As another example, if the end user interacts with a button to cause shooting of a ball, then the system may generate trajectory information indicating this type of motion.

An example technique to update the character control variables may include applying use of weighting to the output character control variables and user input. An example weighting may be based on time. For example, the character control variables may include information associated with a window of time. In this example, the variables may store information for a prior threshold number of frames along with a current frame. Thus, the information for earlier of the frames may be weighted less than the information for later of the frames.

At block 408, the system updates the local motion phases. The system accesses the local motion phases included in the output from the animation system. In some embodiments, the system may update the local motion phases via interpolation with the previous local motion phases (e.g., the local motion phase accessed in FIG. 4A). This interpolation may ensure that local motion phases are maintained in a well-defined manifold.

At block 410, the system inputs updated animation control information. The updated animation control information may therefore represent the output of the animation system, optionally with modifications as described above. This updated information may then be provided as an input to the system, such that motion for the in-game character may be autoregressively updated.

Neural Motion Controller

Figure 5:
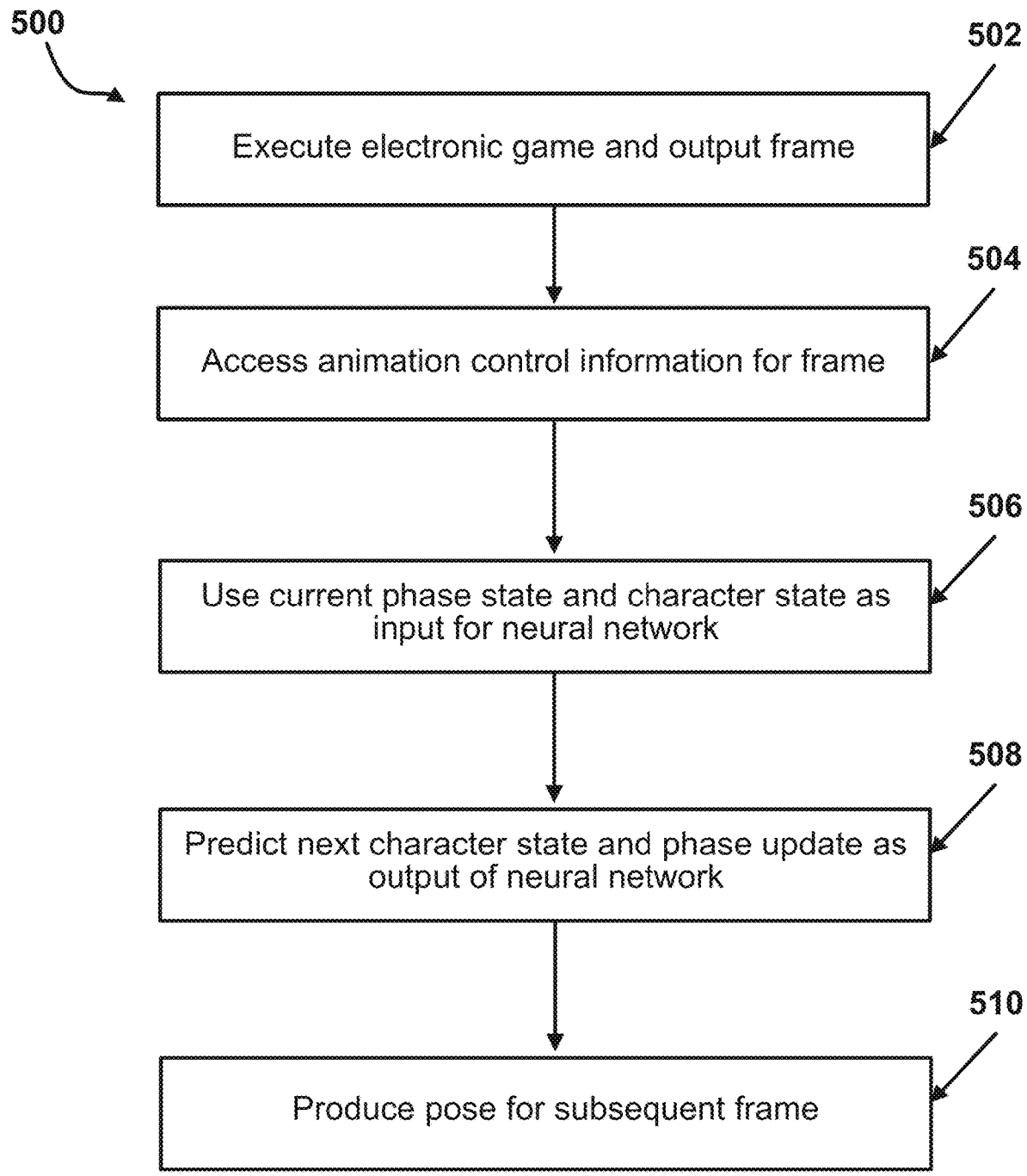
FIG. 5 is a flowchart of an example process for dynamically generating animation using a neural controller.

FIG. 5 is a flowchart of an example process 300 for dynamically generating animation using a neural motion controller based on local motion phases. In some embodiments, the system may represent an electronic game console of one or more processors which is configured to execute electronic games. The dynamic animation generation system 100 may be used to autoregressively generate motion for an in-game character by implementing process 300. The dynamic animation generation system 100 may include different elements usable to generate the motion. For convenience, the process 500 will be described as being performed by a system of one or more computers (e.g., the dynamic animation generation system 100).

For the neural network-based controller, a time series model is developed that predicts the pose in the current frame given the previous frame and current user controls. The model can be trained in a supervised manner using the motion capture data. In one embodiment, a Weight-Blended Mixture-of-Experts framework can be used, but instead of using the velocities or contact-based local phases as input to the gating network, the local motion phases of the phase manifold are used as input features to generate movements in an autoregressive manner. Giving the phase feature as an input helps the system align the motion data along the timeline and allows the character to realistically transition between movements.

At block 502, the system executes an electronic game and outputs a frame. As described herein, the system may implement an animation system usable to update one or more in-game characters of an electronic game. For example, the animation system may cause character poses of the in-game characters to be updated such that animation may be generated.

In some embodiments the system may represent an application, or software, which is in communication with an electronic game. For example, an electronic game console may execute the electronic game and the application or software. In this example, the electronic game console may provide information during runtime of the executing game for use by the application or software. Example information may include a game state associated with the electronic game, which may be used by the application or software to generate or derive the animation control information described above. The application or software may therefore update character poses of one or more in-game characters and provide the updated character poses to the electronic game. In response, the electronic game may update the in-game characters accordingly.

At block 504, the system accesses animation control information for the frame. As described above, with respect to at least FIGS. 1 and 3A, the system may autoregressively generate animation control information. Thus, the system may access animation control information which was generated for the output frame. The information may then be used to generate subsequent animation control information for a subsequent frame.

At block 506, the system uses the current phase state and character state as input for the neural network. The system can autoregressively update the phase state of the character as well as its motion.

At block 508, the system predicts the next character state and phase update as the output of the neural network. The system first predicts the next phase vectors $P_{t+\Delta t}$, the amplitudes $A_{t+\Delta t}$ and frequencies $F_{t+\Delta t}$. Instead of directly using the predicted phase vectors, it is updated as follows:

$$\mathcal{P'}_{t+\Delta t} = A_{t+\Delta t} \cdot I(R(\theta) \cdot \mathcal{P}_t, \mathcal{P}_{t+\Delta t}) \theta = \Delta t \cdot 2\pi \cdot F_{t+\Delta t} \qquad (8)$$

where $\Delta t$ is the frame delta time, R is a 2D rotation matrix, and I is a normalized spherical linear interpolation with weight 0.5. Updating the phase in such a manner enforces the frequency to progress the phase in the direction directly predicted by the neural network. The frequency is a uniform positive value that is simple to predict and keeps the network traversing through the phase space in a one-directional manner. This scheme prevents the motion from appearing stiff or getting stuck in time, which is a common problem observed for data-driven character controllers. The expert gating network learns blending between sets of expert weights and can include a plurality of hidden layers (such as, for example, two hidden layers of size 128), and the motion generation network can include hidden layers (such as, for example, two hidden layers of size 512). In one embodiment, dropout is set to 0.3, batch size is 32, and both learning rate and weight decay are initialized as $10^{-4}$. An AdamWR optimizer may be used with cosine annealing warm-restart scheduling, and set its restart iterations to 10, restart factor to 2.0, and train the model for 150 epochs. In some implementations, training each model requires between 12 to 48 hours. In one embodiment, the network is implemented in PyTorch and generates an ONNX file that can be run in Unity for inference using its Barracuda library.

At block 510, the system produces a pose for the subsequent frame. The system is able to produce a range of biped locomotion movements. The periodic autoencoder 200 framework enables producing more momentum and gravity in the upper body as the extracted phase features contain information that align the upper body motion similarly well. The system can also produce smooth transitions from low-to-high frequent movements with better quality. The system can also work very well for synthesizing quadruped locomotion modes in high quality. The system can synthesize stylized motions. The movements cover a diverse range of different stylized locomotion behaviors, particularly those where the arms are moving at a different periodicity from the legs. Thus, the system may substantially generate updated poses in real-time. Since local motion phases are used, the animation system can quickly react to updates regarding types of motion and actions which are being performed by the end user's in-game character. As described above, the local motion phases may enhance realistic temporal alignment of character poses to form realistic animation of the end user's in-game character.

The system can be trained to perform and dance motion synthesis. To let the character dance in response to different music clips, The model can be trained where the tonal and rhythmic music features (mel spectogram, mel frequency cepstral coefficients, spectral flux, chroma, beats, zero-crossings) are given as control signals, and from which the character motion and trajectory are predicted in an autoregressive manner. The trained system can generalize to test music clips that are different from the training music data: which, in this case, the style of dance whose music features are closest to the test set can be selected and adapted to the music and its beat. When switching randomly between music clips during the dance, the model selects the right timing for the transition and generates appropriate body movements that are outside the data. Therefore, the model prevents unnatural foot skating or body floating artifacts that may happen when instead performing simple linear blending that acts irrespective to the footfall pattern or current gravity of the body to transition between the dance choreographies.

The model can be trained to interface with an external object such as a soccer ball. With soccer dribbling where the ball behaves in a varying manner with respect to the feet. The footballer also conducts various footstep movements of different frequency, particularly during sharp turns while turning with the ball. During runtime, the ball is controlled by physics after separating from the feet, and thus the motion is unseen during training. Using the predicted contacts by the neural character controller and within a small proximity range around the character root, the physics-based ball velocity is interpolated with the ball velocity prediction by the network. Despite such tough conditions where the character has to move aligned with an external object during fast-paced movements, the system predicts the character motion accordingly to continue dribbling the ball. The system is provided with no contact information and still produces realistic interactions between body and object.

Example Computing System

Figure 6:
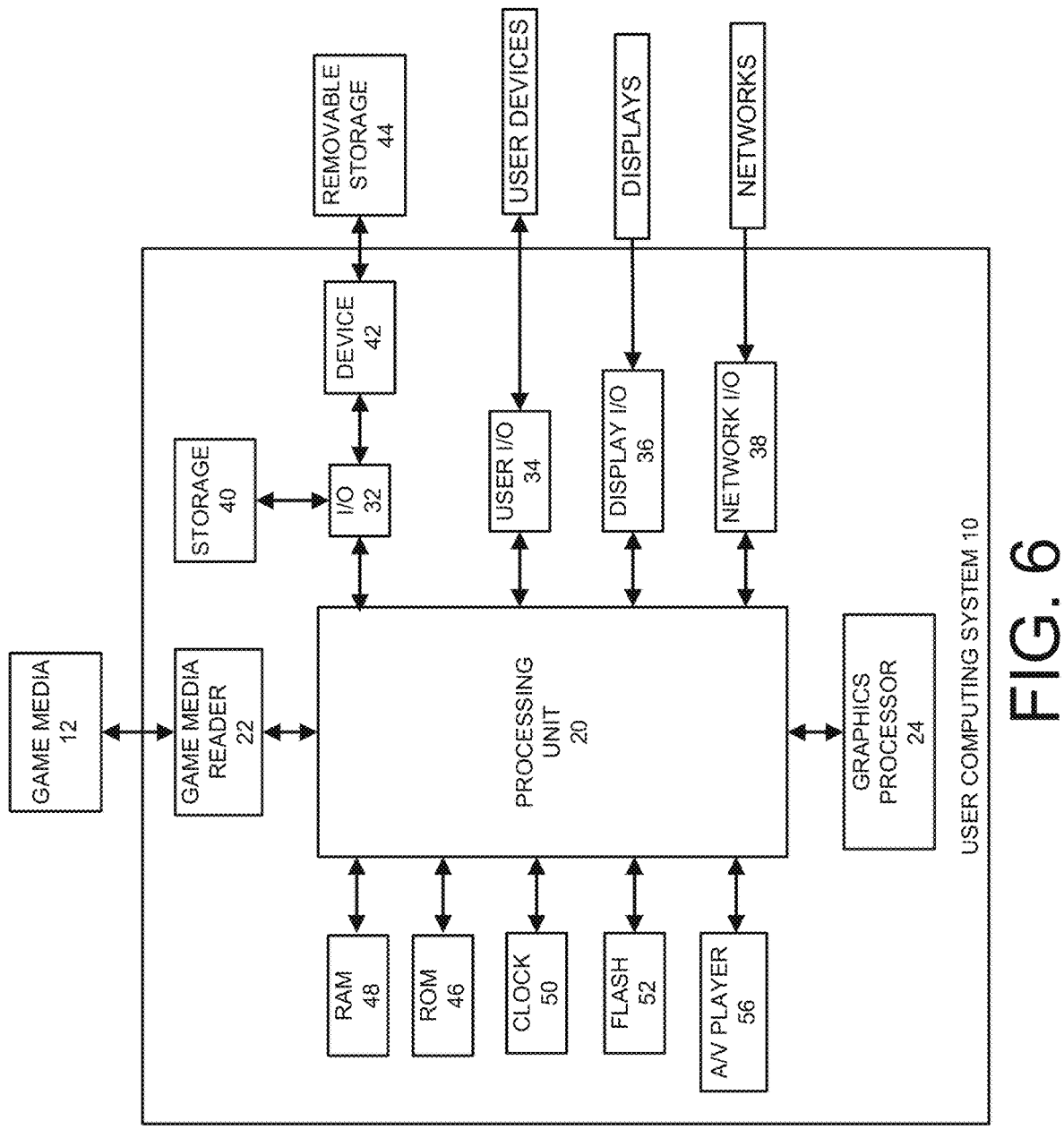
FIG. 6 illustrates an embodiment of computing device according to the present disclosure.

FIG. 6 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by a computing system having at least one processor configured with specific computer-executable instructions,
accessing first animation control information generated for a first frame of an electronic game, the first animation control information including a first pose of an in-game character model;
executing a motion matching process using a motion phase manifold comprising a plurality of local motion phase channels, wherein each local motion phase channel comprises spatial and temporal data for movement of a segment of the in-game character model, the motion matching process results in a plurality of matched local poses, the motion matching process comprising:
determining motion matching criteria for matching the local motion phase to existing local poses within a local pose animation dataset for the corresponding local motion phase channel;
performing a search of the local motion phase channel to identify a plurality of local poses within the local pose animation dataset based on the motion matching criteria;
calculating a score for the plurality of local poses based on reference features associated with the local motion phase; and
selecting a local pose from the plurality of local poses corresponding to the local motion phase based on the score;
generating a second pose of the in-game character model based on the plurality of matched local poses for a second frame of the electronic game;
computing second animation control information for the second frame; and
rendering the second frame including at least a portion of the second pose of the in-game character model within an in-game environment based, at least in part, on the second animation control information.

2. The computer-implemented method of claim 1, wherein a plurality of local motion phase channels are associated with the in-game character model of the electronic game and individual local motion phase channels represent phase information associated with the first pose of the in-game character model within the in-game environment.

3. The computer-implemented method of claim 2, wherein the local motion phase channel is represented by a two dimensional vector encoded with the reference features of the local motion phase.

4. The computer-implemented method of claim 3, wherein the reference features include phase, frequency, and amplitude.

5. The computer-implemented method of claim 3, wherein performing the search comprises performing a nearest neighbor search using the two dimensional vector of the local motion phase channel as compared to two dimensional vectors of local poses in the animation data.

6. The computer-implemented method of claim 1, wherein determining motion matching criteria comprises identifying a motion type associated with the second pose of the in-game character model.

7. The computer-implemented method of claim 6, wherein determining motion matching criteria comprises identifying a subset of the animation data corresponding to the motion type.

8. The computer-implemented method of claim 1, wherein generating the second pose of the in-game character model comprises blending the plurality of local poses with a global pose to generate the second pose.

9. The computer-implemented method of claim 1, wherein the first animation control information comprises information aggregated over a prior threshold number of frames.

10. The computer-implemented method of claim 1, wherein the second animation control information includes updated local motion phase channels, and wherein the updated local motion phase channels are determined via interpolation of the local motion phase channels included in the first animation control information.

11. A system comprising one or more processors and non-transitory computer storage media storing computer-readable instructions that when executed by the one or more processors, cause the one or more processors to perform operations comprising:
    accessing first animation control information generated for a first frame of an electronic game, the first animation control information including a first pose of an in-game character model;
    executing a motion matching process using a motion phase manifold comprising a plurality of local motion phase channels, wherein each local motion phase channel comprises spatial and temporal data for movement of a segment of the in-game character model, the motion matching process results in a plurality of matched local poses, the motion matching process comprising:
        determining motion matching criteria for matching the local motion phase to existing local poses within a local pose animation dataset for the corresponding local motion phase channel;
        performing a search of the local motion phase channel to identify a plurality of local poses within the local pose animation dataset based on the motion matching criteria;
        calculating a score for the plurality of local poses based on reference features associated with the local motion phase; and
        selecting a local pose from the plurality of local poses corresponding to the local motion phase based on the score;
    generating a second pose of the in-game character model based on the plurality of matched local poses for a second frame of the electronic game;
    computing second animation control information for the second frame; and
    rendering the second frame including at least a portion of the second pose of the in-game character model within an in-game environment based, at least in part, on the second animation control information.

12. The system of claim 11, wherein a plurality of local motion phase channels are associated with the in-game character of the electronic game, individual local motion phase channels representing phase information associated with contacts of at least one rigid body of the in-game character model with the in-game environment.

13. The system of claim 12, wherein the local motion phase channel is represented by a two dimensional vector encoded with the reference features of the local motion phase.

14. The system of claim 13, wherein the reference features include position, orientation, velocity, and acceleration.

15. The system of claim 13, wherein the computer-readable instructions further configure the one or more processors to perform a nearest neighbor search using the two dimensional vector of the local motion phase as compared to two dimensional vectors of local poses in the animation data when performing the search.

16. The system of claim 11, wherein the computer-readable instructions further configure the one or more processors to identify a motion type associated with the second pose of the in-game character model when determining motion matching criteria.

17. The system of claim 16, wherein the computer-readable instructions further configure the one or more processors to identify a subset of the animation data corresponding to the motion type when determining motion matching criteria.

18. The system of claim 11, wherein the computer-readable instructions further configure the one or more processors to blend the plurality of local poses with a global pose to generate the second pose when generating the second pose of the in-game character model.

19. The system of claim 11, wherein the local motion phase channels further represent phase information associated with an external object configured to be interacted with by the in-game character model.

20. The system of claim 11, wherein the second animation control information includes updated local motion phase channels, and wherein the updated local motion phase channels are determined via interpolation of the local motion phase channels included in the first animation control information.

* * * * *